United States Patent
Dahnovici et al.

(10) Patent No.: US 12,453,476 B2
(45) Date of Patent: Oct. 28, 2025

(54) MEDICAL DEVICE AND METHOD FOR EXAMINING AN ORGANIC TISSUE

(71) Applicant: KARL STORZ SE & Co. KG, Tuttlingen (DE)

(72) Inventors: Nicoleta Dahnovici, Tuttlingen (DE); Lukas Buschle, Tuttlingen (DE); Werner Göbel, Tuttlingen (DE); Patricia Galuschka, Tuttlingen (DE); Alejandro Blumentals, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 0 days.

(21) Appl. No.: 18/721,776

(22) PCT Filed: Dec. 15, 2022

(86) PCT No.: PCT/EP2022/086085
§ 371 (c)(1),
(2) Date: Jun. 19, 2024

(87) PCT Pub. No.: WO2023/117668
PCT Pub. Date: Jun. 29, 2023

(65) Prior Publication Data
US 2025/0057427 A1      Feb. 20, 2025

(30) Foreign Application Priority Data
Dec. 22, 2021   (DE) .................... 10 2021 134 276.7

(51) Int. Cl.
*A61B 5/00*   (2006.01)
(52) U.S. Cl.
CPC ............ *A61B 5/0075* (2013.01); *A61B 5/743* (2013.01)

(58) Field of Classification Search
CPC .................................................. A61B 5/0075
See application file for complete search history.

(56) References Cited

U.S. PATENT DOCUMENTS

| | | |
|---|---|---|
| 6,122,042 A | 9/2000 | Wunderman et al. |
| 2013/0131517 A1 | 5/2013 | Panasyuk et al. |
| (Continued) | | |

FOREIGN PATENT DOCUMENTS

| | | |
|---|---|---|
| DE | 102017215158 B4 | 10/2020 |
| WO | WO 2017/074505 A1 | 5/2017 |
| WO | WO 2020/025684 A1 | 2/2020 |

OTHER PUBLICATIONS

International Search Report for International Application No. PCT/EP2022/086085, mailed Apr. 18, 2023.
(Continued)

*Primary Examiner* — Joseph M Santos Rodriguez
(74) *Attorney, Agent, or Firm* — Jason H. Vick; Amped IP LLC

(57) ABSTRACT

The invention relates to a medical device (100) and to a method for examining an organic tissue. According to the invention, a reference tissue section (11) is defined, thereby simultaneously defining a reference tissue type. For this reference tissue section (11) a characteristic distribution of multispectral intensity profiles is detected. For a tissue region to be examined multispectral intensity profiles are detected. Tissue sections of the tissue region of interest are associated with the reference tissue types on the basis of the intensity profiles and the characteristic distributions, for example on the basis of a similarity.

11 Claims, 8 Drawing Sheets

(56) References Cited

U.S. PATENT DOCUMENTS

2014/0046197 A1  2/2014  Lucassen et al.
2016/0067007 A1  3/2016  Piron et al.
2020/0107727 A1  4/2020  Piponi

OTHER PUBLICATIONS

Written Opinion for International Application No. PCT/EP2022/086085, mailed Apr. 18, 2023.
International Preliminary Report on Patentability for International Application No. PCT/EP2022/086085, mailed Jul. 4, 2024.

MEDICAL DEVICE AND METHOD FOR EXAMINING AN ORGANIC TISSUE

CROSS REFERENCE TO RELATED APPLICATIONS

This application is a national stage application under 35 U.S.C. 371 of PCT Application No. PCT/EP2022/086085 having an international filing date of 15 Dec. 2022, which designated the United States, which PCT application claimed the benefit of German Application No. 10 2021 134 276.7, filed 22 Dec. 2021, each of which are incorporated herein by reference in their entirety.

FIELD OF THE INVENTION

The present invention relates to a medical device, in particular a surgical device, for examining an organic tissue and a method for examining an organic tissue. An output of the medical device or a result of the method can in particular comprise an assignment of a tissue section of a tissue region to be examined to a previously defined reference tissue type.

TECHNICAL BACKGROUND

During medical examinations, a doctor often has to distinguish between different types of organic tissue, not only based on what type of tissue it is, but also on what state the tissue is currently in. For example, when suturing an intestinal wall, it is essential to know which tissue sections are supplied with oxygen (oxygenated) and which are not (deoxygenated), for example to avoid suturing non-perfused tissue with perfused tissue.

Methods are known in the prior art to analyze tissue based on its electromagnetic spectrum. U.S. Pat. No. 10,156,518 B2 describes a method using a spectral angle mapper, with a similarity of an intensity spectrum of a pixel to a reference spectrum being determined based on angles in a parameter space. Such methods have the disadvantage that tissue sections can sometimes be very inhomogeneous in their intensity spectrum and thus the correct assignment of such a tissue section in its entirety is often not possible. In particular, pathophysiological changes in oncology show a high degree of tissue variability, while healthy tissue often shows more homogeneous physiological parameters.

Distinguishing between several similar reference spectra is often difficult. Furthermore, it is challenging to provide suitable reference spectra, since the external conditions for recording spectra can vary greatly. Outliers in one or a few spectral measurement points are possible, for example, in endoscopic recordings due to overexposure, reflections, contamination of the lens, etc. These often lead to large errors in the classification of the affected pixels using the classic spectral angle mapper.

SUMMARY OF THE INVENTION

Accordingly, it is an object of the present invention to provide an improved method and an improved device for examining organic tissue.

This object is achieved by the subject matters of the independent claims.

According to a first aspect, the present invention provides a medical device, in particular a surgical device, for examining an organic tissue. The device comprises:

an input interface by means of which at least one reference tissue section of a human body can be defined in order to define an assigned reference tissue type;
a multispectral image sensor arrangement which is designed:
  to detect at least one respective characteristic distribution of multispectral intensity profiles, CDMI, for each reference tissue section defined (in particular by means of the input interface) (e.g. by means of a first multispectral image sensor of the multispectral image sensor arrangement), with the respective characteristic distribution comprising multispectral intensity profiles, CDMI, for each position of a first plurality of positions within the respective defined reference tissue section;
  and to detect a multispectral intensity profile of each position of a second plurality of positions of a tissue region to be examined (e.g. by means of a second multispectral image sensor of the multispectral image sensor arrangement),
a computing device which is configured to determine whether, based on the detected characteristic distributions of multispectral intensity profiles, CDMI, at least one tissue section of the tissue region to be examined can be assigned to a reference tissue type (via the CDMI of the assigned reference tissue section) based on the detected multispectral intensity profiles of positions of the second plurality of positions assigned to the at least one tissue section, and, if this is the case, to assign the at least one tissue section accordingly; and
a display device which is configured to indicate the at least one assigned tissue section as being assigned to the corresponding reference tissue type.

The surgical device may in particular be an exoscopic device (e.g. open surgical or microscopic) or an endoscopic device.

An underlying idea of the present invention is that tissue sections usually do not have a completely homogeneous spectrum, i.e. that in an image recording not every pixel belonging to the same reference tissue type has exactly the same spectrum. By detecting characteristic distributions of multispectral intensity profiles, which are each associated (or defined) with a reference tissue type via the assigned reference tissue section, these usual fluctuations within tissue sections can be taken into account. As the inventor has discovered, this results in significantly improved accuracy of the assignment.

The detection of the characteristic distributions of multispectral intensity profiles using reference tissue sections also has the advantage that the external conditions or circumstances of the detection can be selected flexibly and precisely. It is thus possible to optimally respond to each changed situation by defining (e.g. selecting) a suitable reference tissue section with suitable external conditions. This enables particularly intuitive handling, which enables improved human-machine interaction between, for example, a doctor and an examination device (e.g. an endoscope) and/or a treatment device (e.g. a surgical tool).

If the detection of the characteristic distributions of multispectral intensity profiles is carried out under the same or at least similar external conditions (e.g. lighting, surrounding fluid, etc.) as the detection of the multispectral intensity profiles of the tissue region to be examined, white balance can advantageously be omitted. In addition, the sensitivity to stray light effect decreases (or disappears). For example, multispectral images could be recorded underwater without the need for special underwater white balancing.

Lastly, the present invention is also particularly suitable for real-time applications in which
 a) definition of reference tissue types/reference tissue sections on the one hand,
 b) representation of a tissue region to be examined and
 c) the indication of the assignment of parts of the tissue region to be examined to the reference tissue types can all be carried out on one and the same display device and/or input interface. Optionally, the defined reference tissue sections can also be displayed or indicated with the same display device. In this way, the skilled user can additionally check whether they consider the assignment to be plausible. It can also be provided that the reference tissue section and the assigned tissue section are both indicated in a (in particular real-time) true-color image, for example by a semi-transparent overlay or the display of outlines.

A surgical device is a device that can be used for a surgical procedure and comprises, for example, a surgical tool. The device can also comprise an endoscopic tool or an endoscopic imaging device.

Defining a reference tissue type can be explicit or implicit. This can be done explicitly by defining a reference tissue section, e.g. by marking it in a graphical user interface. Optionally, a reference tissue type can then be explicitly assigned thereto by entering a unique free text or selecting it from a selection menu.

A reference tissue type can be defined implicitly by defining, e.g. marking, a reference tissue section, because this implicitly already defines a reference tissue type, namely "the reference tissue type to which the defined reference tissue section belongs". The reference tissue type can also be defined by assigning (automatically or by user selection) an identification symbol, such as a specific color or pattern, to one or a plurality of reference tissue sections. Thus, a reference tissue type "red", a reference tissue type "green" and the like can be defined. This has the advantage that it can be determined immediately how tissue sections that are identical to or belong to the respective reference tissue type are also graphically indicated with the corresponding pattern, for example in a real-time image of a multispectral image sensor arrangement.

A tissue section can in particular be a part of a tissue (e.g. an epidermis or another organic tissue) which is selected, for example, on an image representation. This means that tissue sections do not necessarily have to be defined on the real tissue, but can advantageously be defined on an image of real tissue, for example using a camera image or a video recording or an image recording of real tissue.

The definition of a reference tissue type can also comprise a current (physical, physiological, pathological, etc.) state. For example, it is conceivable that when defining a tissue type, a distinction is made between oxygenated and deoxygenated tissue, even if they are otherwise the same (or even the same) tissue, such as the epidermis of a human hand or an organ wall. For example, when suturing a tear in an organ, it may be important to determine which tissue sections are supplied with oxygen (oxygenated) and which are not (deoxygenated). However, the definition of the tissue type can of course also be based on tissue types (e.g. tumor tissue, healthy tissue, etc.). The extent to which subtypes, states, etc. are to be taken into account when defining the tissue type can be set in devices according to some embodiments, for example depending on the desired purpose.

Each reference tissue section can define its own reference tissue type. However, it can also be provided that a plurality of reference tissue sections can be defined for a reference tissue type, for which the characteristic distribution of multispectral intensity profiles is then detected or generated as a whole. Since the definition of reference tissue types is based on the definition of reference tissue sections, the two terms are sometimes used interchangeably. In particular, it is understood that the characteristic distributions of multispectral intensity profiles, CDMIs, are detected using the defined reference tissue sections. This results in a direct assignment of the CDMIs to the reference tissue types, which were defined by, or based on, the reference tissue sections.

A multispectral intensity profile should generally have intensity values that belong to at least two electromagnetic wavelengths or wavelength ranges. It may, for example, contain a description of intensity values N of discrete electromagnetic wavelengths, for example as a set of N tuples, with each tuple having, first, a different electromagnetic wavelength (or, equivalently, an electromagnetic frequency) and, second, an associated intensity value.

Preferably, intensity values for the same predefined electromagnetic wavelengths ("standard wavelengths") are given in each of the multispectral intensity profiles such that the intensity profiles can be better compared with each other. However, if intensity profiles exist that, for example, do not have an intensity value for one of the standard wavelengths, an intensity value for the corresponding standard wavelength can be intrapolated or extrapolated for these intensity profiles.

Since electromagnetic wavelengths cannot be filtered with arbitrary precision anyway, it is understood that in practice the intensity values will always be intensity values over a certain spectral range, i.e. an interval of wavelengths. How wide these intervals are also depends on the resolution of the multispectral image sensor arrangement used. In some variants, it may also be provided that the entire definition range of the intensity profiles is divided into adjacent intervals and an intensity value is provided for each interval. However, in particular in areas of application where individual wavelengths are highly informative (e.g. when using contrast agents or radioisotopes), it is advantageous to provide intensity values for substantially individual wavelengths in the intensity profiles.

The standard wavelengths can be equidistant from each other within the given definition range. Alternatively, standard wavelengths can also be arranged non-equidistantly in one or a plurality of spectral ranges of the intensity profile, in particular closer than in the surrounding spectral ranges. This is advantageous when a certain spectral range enables particularly precise distinctions between individual tissue types. The standard wavelengths and thus also the intensity profiles are advantageously in the spectral range between 400 nanometers and 1000, preferably between 500 and 900 nanometers.

Depending on which type of tissue is to be examined or expected, and which states are to be identified, it is advantageous if at least certain spectral ranges are also detected, i.e. if at least some standard wavelengths are at least partly in these specific spectral ranges.

If oxygenation (oxygen saturation, often abbreviated to "StO2") of a tissue region to be examined is to be identified, in particular with regard to superficial perfusion, the spectral ranges between (inclusive) 570 nanometers and 590 nanometers and/or between (inclusive) 740 nanometers and 780 nanometers are advantageous.

For the oxygen saturation of deeper tissue layers of the tissue region to be examined, for example, the spectral ranges between (inclusive) 655 nanometers and 735 nanometers and/or between (inclusive) 825 nanometers and 925 nanometers are advantageous.

Another state of interest of a tissue region to be examined can be the water content in the tissue. This can be characterized by the tissue water index (TWI). For this purpose, for example, the spectral ranges between (inclusive) 875 nanometers and 895 nanometers and/or between (inclusive) 950 nanometers and 975 nanometers are advantageous.

Another state of interest of a tissue region to be examined can be a local blood volume, which can be characterized, among other things, by the organ hemoglobin index (OHI). For this purpose, for example, the spectral ranges between (inclusive) 530 nanometers and 590 nanometers and/or between (inclusive) 785 nanometers and 825 nanometers are advantageous.

Particularly preferably, at least one standard wavelength lies in as many of the above-mentioned preferred spectral ranges as possible, so that the device can be used for the examination and identification of a large number of tissue types and their states.

To account for dynamic effects in the recording of multispectral intensity profiles, the reference tissue section can be optically or electromagnetically tracked or averaged. In this way, any instabilities of the system with regard to the recording (lighting fluctuations, distance-dependent stray light effects, etc.) can be avoided, e.g. calculated out.

In particular, "multispectral" means that each intensity profile has intensity values for at least two different electromagnetic wavelengths (N>1). Each additional wavelength in the intensity profile tends to increase the accuracy of the invention, but at the same time also increases the measurement and computational effort. The inventor has found that a number N of wavelengths in each intensity profile is preferably between 30 and 200, more preferably between 50 and 150, particularly preferably between 75 and 125.

Multispectral intensity profiles also include so-called hyperspectral intensity profiles, which provide a continuous description of the intensity as a function of the electromagnetic wavelength (within a predetermined definition range). By discretely reading out individual values (or by intervalwise integration and averaging) at the standard wavelengths, a discrete multispectral intensity profile can be generated from any hyperspectral intensity profile. Conversely, a hyperspectral intensity profile can also be generated by interpolation from a discrete multispectral intensity profile. However, it is preferred to use discrete intensity profiles for ease of use, i.e. to automatically convert hyperspectral intensity profiles, if available, into discrete intensity profiles.

The multispectral intensity profiles are preferably automatically normalized to a common standard value. In the following, it is described, without limiting the generality, that this standard value is "1", although it is understood that any other numerical value (except 0) can also be used. The normalization has the advantage that the relations of the intensity values within an intensity profile to one another, which according to the inventor's knowledge contain the essential information about the tissue type, are thereby preserved and thus become comparable between different intensity profiles.

The influence of the factor, for example, whether a certain part of a tissue section or tissue region was closer or further away from a light source than another when the intensity profiles were recorded, and thus possibly has higher or lower intensity values in absolute terms, can thus be reduced or even eliminated. Mathematically, normalization to the value "1" means that in a parameter space in which each of the N standard wavelengths is assigned a spatial dimension that describes the intensity value associated with this standard wavelength, each intensity profile can be described by a point on the unit sphere in this N-dimensional parameter space.

The characteristic distribution of multispectral intensity profiles, CDMI, is a set of at least two multispectral intensity profiles, each of which corresponds to a different position within the selected reference tissue section. After normalization to "1", a CDMI corresponds to a distribution of points on the spherical shell in N-dimensional space. Advantageously, each CDMI comprises the multispectral intensity profiles of all available pixels of the (or the plurality of) assigned reference tissue section (or sections).

In the foregoing and in the following, terms are sometimes abbreviated with acronyms, such as "CDMI" for "characteristic distribution of multispectral intensity profiles" or "CDMIs" for "characteristic distributions of multispectral intensity profiles". Usually the long version is used, followed by the corresponding acronym. However, in some cases, to improve readability, only the acronym will be used, while in other cases the acronym will be omitted. The acronym and the long version should always be synonymous.

A multispectral image sensor of the multispectral image sensor arrangement can in particular be a hyperspectral camera from XIMEA GmbH from Munster, Germany, e.g. the model MQ022HG-IM-LS150-VN2 with a spectral width of 470 nanometers to 900 nanometers, with 150 spectral bands being recorded. Alternatively, a hyperspectral camera from Diaspective Vision GmbH from Am Salzhaff-Pepelow, Germany, can also be used. Options as described in U.S. Pat. No. 10,156,518 B2 can also be used.

It is understood that the multispectral image sensor arrangement advantageously also has its own light source (or generally: source of electromagnetic radiation) to expose the reference tissue sections and the tissue regions to be examined to light (or electromagnetic radiation in general) such that intensity profiles can be detected based on the reflected and backscattered light (or electromagnetic radiation). When light is spoken of here, this should in principle refer to any electromagnetic radiation, but preferably in the spectrum between 500 nanometers and 1000 nanometers.

Providing the multispectral image sensor arrangement with its own light source or radiation source has the advantage that (even in the presence of additional light or radiation sources) a considerable, advantageously predominant, proportion of defined incident light (or radiation) is present and thus the detection of the intensity profiles takes place under more controlled conditions. The light source can, for example, be a white light source. The light from the light source can either shine directly onto the tissue to be examined and the reference tissue sections or be guided there via a light guide.

The multispectral intensity profiles will therefore generally not be based on emission but on scattering and reflection after irradiation with a light source. Intensity profiles that include excited emissions are also conceivable, for example when optical markers are introduced. Such optical markers can be, for example, fluorescent markers such as indocyanine green (abbreviated: ICG), pafolacianine (OTL-38), cyanine dyes such as CY5, or fluorescein or the like.

The same multispectral image sensor can be used for detecting the characteristic distributions of multispectral intensity profiles, CDMI, on the one hand, and for detecting the multispectral intensity profiles of the positions of the second plurality of positions on the other hand. Alternatively, different multispectral image sensors of the multispectral image sensor arrangement can be provided and used, for example if a different spectral resolution is to be used in each case. It is thereby advantageous if the first multispectral image sensor for detecting the characteristic distributions of multispectral intensity profiles for the reference tissue sections on the one hand and the second multispectral image sensor for detecting the multispectral intensity profiles in the tissue region to be examined on the other hand have a similar, or the same, wavelength-dependent sensitivity.

In some variants, it may be provided that more than one characteristic distribution of multispectral intensity profiles can be defined for a reference tissue section, for example if the corresponding tissue section contains a mixture of different structures.

The detection of a multispectral intensity profile can in particular be carried out in such manner that a multispectral image is recorded by means of the multispectral image sensor arrangement, with a channel of the multispectral image usually being assigned at least to each electromagnetic wavelength which is to be part of the intensity profile (i.e. which is defined as the standard wavelength). This channel provides intensity values for the assigned electromagnetic wavelength. This is comparable to the red (R), green (G), and blue (B) channels of an RGB image. By recording or generating the multispectral image, the intensity values for at least all standard wavelengths are already provided, i.e. detected, for each pixel (defined, for example, as the smallest distinguishable or detectable unit of the image).

The generation of each intensity profile for each pixel can thus be done by simply reading the intensity values from the recorded multispectral image for the corresponding pixel. Depending on the specific embodiment (or setting within a specific device according to an embodiment), the intensity profile can then be read out, for example, for each pixel within the tissue region to be examined. In this case, the second plurality of positions within the tissue region to be examined would be equal to the total number of pixels within the tissue region to be examined. This variant is particularly preferred because it has the greatest possible accuracy due to the largest possible amount of data.

However, it is also conceivable that the second plurality of positions comprises only a subset of the available pixels of the tissue region to be examined, for example according to a regular selection, e.g. in a regular grid. For example, only every fifth, every tenth, . . . , etc. pixel in each of the two dimensions of the multispectral image may be part of the second plurality of positions. This is useful to reduce the amount of data to be processed and/or when the resolution of the multispectral image is higher than necessary for the current application.

Depending on how long the device needs to assign tissue sections, it may be advantageous, in particular in real-time applications (e.g. in a real-time mode of the device), to reduce the number of positions of the second plurality of positions so that the assignment also takes place substantially in real time. In the case of an already planned time offset between the recording of multispectral images by means of the multispectral image sensor arrangement and the assignment by the computing device, and/or in an accuracy mode of the device, the number of positions can be selected to be maximum in order to improve the accuracy of the assignment.

The number of positions, or the distances between the positions of the second plurality of positions, may be adjustable by a user or automatically. For example, it can be provided that a user, who is not satisfied with the result of the display device, can increase/decrease the number or decrease/increase the distances using a setting on a user interface. An adjustment can also be made automatically, for example based on the result of an algorithm that assesses the quality of the assignment of the tissue region to be examined. The number of positions can also be inhomogeneous or adjusted in this way.

For the sake of simplicity, most of the following examples and explanations will deal with the case where the second plurality of positions of the tissue region to be examined are identical to the pixels of an image recording which comprises the tissue region to be examined. However, it is understood that alternatively a selection of the pixels can be used, as explained in detail above. The tissue region to be examined can be of any size, from a single pixel to the entire image recording.

The tissue region to be examined can be the tissue that is visible in a recorded multispectral image, i.e. the entire image could have to be examined. In some variants, or in some settings or functional modes of devices according to embodiments of the present invention, it can be provided that a user can select or define the tissue region to be examined within a recorded multispectral image. This can be done, for example, by using a finger or a stylus to draw a closed loop on a display device that shows the multispectral image, within which closed loop lies the tissue region to be examined.

The device can also be configured in such manner that the tissue region to be examined can be defined by using a fingertip and/or a (e.g. surgical) tool as a pointing instrument. For this purpose, the input interface can comprise a camera device with object recognition, which is designed and configured to generate a real-time image recording and to recognize the position of the pointing instrument therein. A tissue region detection mode, in which the pointing instrument is detected and is used to define the tissue region to be examined, can be started in a variety of ways. It is preferred if the tissue region detection mode can be started by the surgeon without using their hands. In this way, the surgeon who is guiding the tool (such as scissors or forceps) can, in the meantime, start the tissue region detection mode without having to leave the tissue region to be examined with the tool.

For example, the device can comprise a speech recognition device which is configured to start the tissue region detection mode in response to a first predefined command (e.g. "start detection") and to end the tissue region detection mode in response to a second predefined command (e.g. "stop detection").

Starting/stopping the tissue region detection mode can also be triggered by a foot switch, or by a predefined gesture with the tool or finger in the region of the camera device with object recognition. Alternatively, starting/stopping the tissue region detection mode can also be triggered by a mechanical or software-implemented switch, either by the surgeon themselves or by an assistant.

The tissue region to be examined can be defined in the tissue region detection mode, for example by circling a tissue region with the pointing instrument.

Alternatively or additionally, the device can also be configured in such manner that the tissue region to be examined can be defined by moving a pointing element (e.g. a mouse pointer or crosshairs) in a real-time camera image using a 3D mouse. The pointing element can be used in the same way as the pointing instrument to move around the tissue region to be examined. The 3D mouse can be covered with a sterile cover such that the surgeon can operate it even during an operation.

The device can also alternatively or additionally be configured in such manner that the tissue region to be examined can be defined by a pointing element (e.g. a mouse pointer or crosshairs) being fixedly arranged in a real-time camera image (e.g. in the geometric middle point of the image) and can thus be moved by moving the camera device with respect to the organic tissue or the patient. Thus, for example, by circular movement of the camera device, the tissue region to be examined can be defined, namely as the tissue region that was outlined by the trajectory of the pointing element. This eliminates the need to use an additional 3D mouse.

The element used to define the reference tissue sections may depend on the type of application desired and may therefore be variable within one and the same device. For example, during a diagnostic task, the physician in charge often holds the camera (i.e. the multispectral image sensor) in their hand, so it is useful if the reference tissue section can be defined using this camera, for example with a pointing element (e.g. crosshairs) as explained above. During an operation, however, the physician in charge often holds a surgical tool (e.g. a scalpel, scissors or forceps) in their hand, so it is useful to define the reference tissue sections using the tool as a pointing instrument. The device can be set, e.g. via a graphical user interface, to define the manner in which the reference tissue section(s) are to be defined, with this also being able to be handled differently from reference tissue section to reference tissue section.

The assignment of at least one tissue section to a reference tissue type can also be referred to as classification, since the reference tissue types defined by the reference tissue sections can be regarded as classes.

The check as to whether, based on the detected characteristic distributions, at least one tissue section of the tissue region to be examined can be assigned to a reference tissue type using the detected multispectral intensity profiles (namely the intensity profiles of those positions associated with the at least one tissue section) can be carried out implicitly, namely in the simplest case by assigning the at least one tissue section accordingly. In particular, if the settings have been made in such a way that each tissue section can necessarily be assigned to a reference tissue type, the check can be exhausted in a trivial affirmative response. This can occur, for example, if a "background" reference tissue type is defined, to which every tissue section is assigned that cannot be assigned to any of the other defined reference tissue types, as a catch-all classification in the sense of the usual "background" type in the standard image classification using artificial neural networks.

In other variants, for example when it is a question of determining whether or not a certain concrete reference tissue type is present in the tissue region to be examined, the check can be more complex. For example, for each assignment (of a tissue section to a reference tissue type) made by the computing device, a reliability value of the assignment can in turn be generated by the computing device. When checking whether at least one tissue section can be assigned, the reliability value generated for each tissue section can be compared with a reliability threshold value, and the respective tissue section can only be recognized as assignable if its reliability value is above the threshold value. The reliability value can, for example, be a probability value that the assignment is correct, with it then being able to be provided that the probability value must be above a (e.g. predefined fixed) probability threshold value so that the associated tissue section is recognized as assignable.

However, the reliability value can also indicate a difference between a characteristic of the tissue section (based on the associated intensity profiles of the associated positions) and a respective characteristic of each reference tissue section (and thus reference tissue type). In such a case, the reliability value may be a similarity value or be referred to as such. A threshold value can also be provided for this. It can also be provided that the reliability value of the most reliable assignment must have a minimum distance (absolute or percentage) to the reliability value of the next most reliable assignment. This can prevent small differences, e.g. within the scope of measurement inaccuracy, from potentially inaccurately differentiating between two very similar reference tissue types.

It is also possible for the display device to display the associated reliability value (e.g. similarity value) for each assignment, either automatically or on request. In this way, a user can better assess how much they take the assignment by the device into account. It can also be provided that, depending on the reliability values, settings of the device are automatically adjusted or adjustments are suggested to a user for confirmation or execution. For example, as described above, the number of positions of the second plurality of positions could be increased if all reliability values are below a predetermined threshold value.

The computing device can be any device that is designed and configured for digital computing, in particular for executing software, an application or an algorithm. The computing device can, for example, comprise at least one processor unit (e.g., at least one CPU), at least one graphics processor unit (e.g., at least one GPU), at least one field-programmable gate array, FPGA, and/or at least one application-specific integrated circuit, ASIC, and/or any combination of the aforementioned elements. The computing device can also have a memory and/or a non-volatile data memory operatively linked to each other and/or to some or all of the aforementioned elements. The computing device can be implemented partially or completely in a local unit (e.g. a personal computer, PC, laptop, notebook or the like) and/or partially or completely in a distributed system, e.g. a cloud computing platform or a spatially separated server.

In the following and the preceding sections, various modes of the device have been and will be explained. These serve to specifically discuss various functionalities of the device. The names of the modes can of course be freely chosen. The modes can actually be selected by a user, but it can also be provided that a plurality of or even all modes are active at the same time, or that a mode is automatically activated or deactivated by a respective action (or lack of action). For example, it can be provided that in order to define the at least one reference tissue section and to detect the characteristic distribution of multispectral intensity profiles, the device must first be put into a "definition mode", while in order to detect the multispectral intensity profile of the positions of the tissue region to be examined, it must be put into an "indication mode", with "definition mode" and "indication mode" excluding each other. However, it can also be advantageously provided that both can take place simultaneously, in real time, such that in this variant the device would be in "definition mode" and in "indication mode" at the same time. The same procedure can be used with other possible modes.

The indication of the at least one assigned tissue section as being assigned to the corresponding reference tissue type can be carried out by the display device in a large number of variants. In principle, it is advantageous if the display device comprises a screen and represents the tissue region to be examined for the user, or at least the at least one assigned tissue section. This representation can be realistic, i.e., for example, based on an additional image recorded by a conventional imaging camera, or based on an image visible to humans, which is generated from suitable channels (wavelengths) of the multispectral image data already detected. In this representation, each successfully assigned tissue section can then be colored with a different color, with the colors characterizing the reference tissue types. If the device is to be used to distinguish between oxygenated and deoxygenated tissue, the former could be colored red or orange and the latter blue or green. Indicating using patterns (e.g. for users with color recognition difficulties) is also conceivable.

In another variant, the display device can be or comprise a projection device with which, for example, the at least one assigned tissue section is indicated in real time directly on a patient's body by means of light. For this purpose, a spatial coordination—known in the prior art—is established between the projection device and the multispectral image sensor arrangement. In operating rooms, for example, this can be permanently configured and fixed.

According to some preferred embodiments, variants or further developments of embodiments, the input interface is integrated into a display device which is configured both to define the at least one reference tissue section and to indicate the at least one tissue section of the tissue region to be examined which is assigned to the reference tissue type. This enables a particularly efficient human-machine interaction, since a user of the device can both define the reference tissue sections and recognize the assignment of the assigned tissue section on one and the same display device, preferably in real time. This allows the user to react immediately to the results of the assignment and, for example, change the definition of the reference tissue section again. The display device with integrated input interface can, for example, be a touchscreen.

Alternatively, the display device and input interface can also be designed to be completely or partially separate. For example, it can be provided that a user defines the at least one reference tissue section by means of an input device (such as a computer mouse, keyboard, or trackball), optionally using the display device, which shows the user where, for example, the mouse pointer is currently located. Also conceivable is a first display device for indicating the assignment of the assigned tissue region and a second display device for defining the at least one reference tissue section.

According to some preferred embodiments, variants or further developments of embodiments, at least one tissue section of interest, TSI, can be defined by means of the input interface. For this purpose, the device can, for example, be put into an "analysis mode". The computing device can be configured (in this analysis mode) to determine at least for the tissue section of interest whether this can be assigned to a reference tissue type based on the positions of the second plurality of positions assigned to this tissue section of interest, TSI, and, if this is the case, to assign the TSI to the corresponding reference tissue type.

For example, a user (e.g. a surgeon) may notice a specific location during a surgical procedure. The user can then define a tissue section of interest at the specific location by means of the input interface and, if necessary, read the assignment on the display device. Alternatively or additionally, the user can of course always define the tissue section of interest as a reference tissue section, for example in order to have similar tissue sections displayed in a camera image as being associated with the same tissue type, if such sections are present (or can be assigned).

According to some preferred embodiments, variants or further developments of embodiments, the computing device is configured to implement an artificial intelligence module, AI module. The artificial intelligence module, AIM, is trained and configured to receive the characteristic distributions for the reference tissue sections and at least one multispectral intensity profile of the second plurality of positions as input and, based thereon, to generate an output which indicates a similarity of at least one tissue section (corresponding to the second plurality of positions) to the at least one reference tissue section.

Advantageously, the second plurality of positions corresponds to the totality of the pixels of an N-channel multispectral 2-dimensional image (bitmap) of the multispectral image sensor arrangement. Training data for training the artificial intelligence module, AIM, can thus be generated, for example, in the following way: first, multispectral 2-dimensional images are recorded by means of a multispectral image sensor. A skilled user, e.g. a doctor, then defines reference tissue sections in the images (or in separate images) and assigns these to reference tissue types. Based on this, associated characteristic distributions of multispectral intensity profiles, CDMIs, are created. Each CDMI consists of the intensity profiles of all pixels that belong to the corresponding reference tissue section and thus reference tissue type.

The user then annotates each pixel in the recorded images as accurately as possible as being associated with one of the reference tissue types for which characteristic distributions have been created. These annotations for each pixel thus form the labels or "ground truths" for the recorded images. With the annotated (or labeled) images as training data, the artificial intelligence module (AIM) can now be trained by supervised machine learning in order to minimize deviations of the prediction of the artificial intelligence module (AIM) from the respective label (as the desired result of the prediction) in the usual way. For this purpose, a cost function is usually calculated, which penalizes deviations between labels and prediction (e.g. pixel by pixel), and which is minimized by means of a training algorithm, for example using backpropagation and gradient descent.

Accordingly, the present invention also provides a method for generating training data, comprising the steps:
  providing characteristic distributions of multispectral intensity profiles which are assigned to predefined reference tissue types (for example, by defining reference tissue sections and reference tissue types and detecting the characteristic distributions of multispectral intensity profiles as described above);
  providing multispectral 2-dimensional images, in particular by means of recording by a multispectral image sensor;
  annotating (or: "labeling"), by a user, of each pixel as being associated with one of the predefined reference tissue types in order to generate images annotated (or: labeled) in this way from the provided multispectral 2-dimensional images.

Using the training data, an artificial intelligence module, AIM, can then be trained or a trained artificial intelligence module, AIM, can be provided by the following steps:
  providing an artificial intelligence module, AIM, in an initial configuration, with the artificial intelligence module, AIM, being designed to receive as input data an N-channel multispectral 2-dimensional image and, based thereon, to generate output data which assigns each pixel of the 2-dimensional image to a reference tissue type;

training the artificial intelligence module, AIM, by means of supervised learning based on the annotated images to generate a trained artificial intelligence module, AIM.

The invention thus also provides a trained artificial intelligence module, AIM, and a method for training an artificial intelligence module, AIM.

The artificial intelligence module, AIM, can in particular be or comprise an artificial neural network. For image processing, in particular of multispectral images, the use of at least one convolutional layer has proven to be advantageous.

The artificial intelligence module, AIM, can have randomly initialized parameters in the initial configuration, for example by giving all values for weights and biases of an artificial neural network random values within predefined limits. The initial configuration can also be provided by pre-training, i.e., a pre-trained artificial intelligence module, AIM, can be provided and retrained by means of "transfer learning" in the manner described above.

Each pixel can be assigned to a reference tissue type by providing a softmax function for each pixel at the output of the artificial intelligence module, AIM, which generates a probability distribution for each pixel, with each probability value of the probability distribution indicating the probability with which the pixel can be assigned to a specific reference tissue type. The final assignment can then be made to the reference tissue type for which the highest probability was determined.

According to some preferred embodiments, variants or further developments of embodiments, the computing device is configured to implement a similarity determination module. The similarity determination module can be used as an alternative to the artificial intelligence module, AIM, or in some embodiments complement it.

The similarity determination module is configured:
to generate a respective first parameter representation in a parameter space for the detected characteristic distributions, CDMI, according to a predetermined algorithm,
to generate a respective second parameter representation in the same parameter space for at least one intensity profile of the second plurality of positions, and to calculate a similarity (in particular a similarity value) between at least one first and at least one second parameter representation based on a predefined similarity metric,
with the assignment of a tissue section to a reference tissue type being based on the determined similarities.

That is to say that the reference tissue types are characterized (or parameterized) by first parameter representations, and the intensity profiles of the second plurality of positions (e.g., of pixels of a tissue section within the tissue region to be examined) by second parameter representations.

Preferably, it is determined to which first parameter representation each second parameter representation is most similar according to the similarity metric and is then assigned to this first parameter representation. Through the chain: Position→second parameter representation→first parameter representation→reference tissue type thus enables each position to be assigned to a reference tissue type.

According to some preferred embodiments, variants or further developments of embodiments, the device is configured to display a real-time image of the tissue region to be examined by means of the display device and to graphically indicate the at least one assigned tissue section as being assigned to the corresponding reference tissue type in the real-time image substantially in real time. As already described above, this can be done, for example, by overlaying colors and/or patterns. The real-time representation has the particular advantage that, for example, a surgeon is always informed about the tissue types of interest in a particularly clear manner during an operation. For example, it can be observed in real time whether a certain tissue section is supplied with oxygen (oxygenated) or not (deoxygenated).

According to some preferred embodiments, variants or further developments of embodiments, the multispectral image sensor is arranged or integrated on or in an endoscope or exoscope. The multispectral image sensor can, for example, be flanged to an endoscope distally in an endoscope tip or proximally in a camera head. For example, the camera head can be used to generate a true-color real-time image, while the multispectral image sensor detects the multispectral intensity profiles. An endoscope and/or an exoscope can therefore also be part of the present device. The same applies to other display devices that represent the true-color real-time image data from a camera head of the endoscope or exoscope.

According to some preferred embodiments, variants or further developments of embodiments, the positions of the first plurality of positions and/or the positions of the second plurality of positions are given by pixels (preferably all pixels) according to a spatial resolution of the multispectral image sensor arrangement (or at least one multispectral image sensor), in particular within the same image, preferably real-time image. This means that the existing resolution of the multispectral image sensor arrangement can be optimally utilized.

According to some preferred embodiments, variants or further developments of embodiments, the multispectral intensity profiles of the characteristic distributions of the reference tissue sections have a higher spectral resolution than the multispectral intensity profiles of the positions of the second plurality of positions. Since the reference tissue types and reference tissue sections can be prepared before an intervention, for example, they can also be recorded with more precise multispectral image sensors. Even if multispectral image sensors with lower spectral resolution are then used while the device is used, this can improve the overall accuracy of the assignment.

According to some preferred embodiments, variants or further developments of embodiments, the computing device is configured to monitor the characteristic distributions of multispectral intensity profiles, CDMI, of the positions of the first plurality of positions for any changes and, if changes correspond to a predefined relevance criterion, to cause the affected characteristic distributions of multispectral intensity profiles to be re-detected. This can also be referred to as reference tissue section tracking.

The idea behind this is that the external circumstances can change significantly during the detection of CDMIs, sometimes precisely when a user of the device does not want to perform a new detection process. During an operation performed under water, it could happen that fluids such as blood or urine run into the water and thus change the optical spectra detected. As another example, movement of the multispectral image sensor arrangement or a multispectral image sensor, or turning on or off an ambient light source, or otherwise changing the lighting situation, may also change the detected optical spectra.

Such changes between the detection of the CDMIs on the one hand and the detection of the multispectral intensity profiles of the tissue region to be examined on the other hand can lead to inaccuracies. Tracking thus makes it possible for the CDMIs to always be kept up to date without any further user intervention, so that the tissue region to be examined can always be analyzed accurately. Tracking can be activated/deactivated by a user, for example by a voice command, a foot switch and/or the like. Tracking is particularly useful when the reference tissue sections always remain within the detection range of the multispectral image sensor arrangement. In addition, tracking is particularly useful when the CDMIs exhibit distance dependence.

For tracking when the detection region changes, the device must receive information about where the reference tissue sections are located in the detection region of the multispectral image sensor arrangement after they have been defined. This can be done either by digital image processing, i.e. by the computing device detecting the change in the detection region and then calculating and compensating for the change in the positions of the reference tissue sections.

Alternatively, the movement of the multispectral image sensor arrangement (or part of it) itself can be tracked and conclusions can be drawn from this about the change in the positions of the reference tissue sections. Such tracking can be achieved, for example, by a multispectral image sensor comprising an electrical coil and moving it in a (preferably inhomogeneous) magnetic field, such that conclusions can be drawn about the movement of the multispectral image sensor from the current induced in the coil.

Alternatively, optical tracking of the multispectral image sensor can be carried out, for example by using another, fixed tracking camera device to detect the movement of the multispectral image sensor and use this to draw conclusions about the change in its detection range. To facilitate optical tracking, the multispectral image sensor can be provided with optical markers which are particularly easy to recognize by the fixed tracking camera device, for example reflectors, light elements (e.g. glowing balls) or the like.

The invention also provides, according to a second aspect, a method for examining an organic tissue. The method comprises the following method steps:
  defining at least one reference tissue section of a human body to define an assigned reference tissue type;
  detecting, for each defined reference tissue section, at least one respective characteristic distribution of multispectral intensity profiles, CDMIs, with the respective characteristic distribution, CDMI, comprising multispectral intensity profiles for each position of a first plurality of positions within the selected reference tissue section;
  detecting a multispectral intensity profile of each position of a second plurality of positions of a tissue region to be examined;
  determining whether, based on the detected characteristic distributions, at least one tissue section of the tissue region to be examined can be assigned to a reference tissue type using the detected multispectral intensity profiles of positions of the second plurality of positions associated with the at least one tissue section;
  assigning, if at least one tissue section can be assigned to a reference tissue type, the at least one tissue section accordingly; and
  graphically indicating the at least one assigned tissue section as being assigned to the corresponding reference tissue type.

The method according to embodiments of the second aspect of the present invention can in particular be carried out by means of the device according to embodiments of the first aspect, and vice versa. All variants, options and modifications described with regard to the device can therefore also be applied to the method and vice versa.

The above configurations and further developments can be combined as desired, provided that it makes sense. Further possible configurations, further developments and implementations of the invention also include combinations of features of the invention described above or below with respect to the exemplary embodiments that are not explicitly mentioned. In particular, the person skilled in the art will thereby also add individual aspects as improvements or additions to the respective basic form of the present invention.

SUMMARY OF THE DRAWING

The present invention will be explained in more detail below with reference to the exemplary embodiments indicated in the schematic figures. They show.

Figure 1:
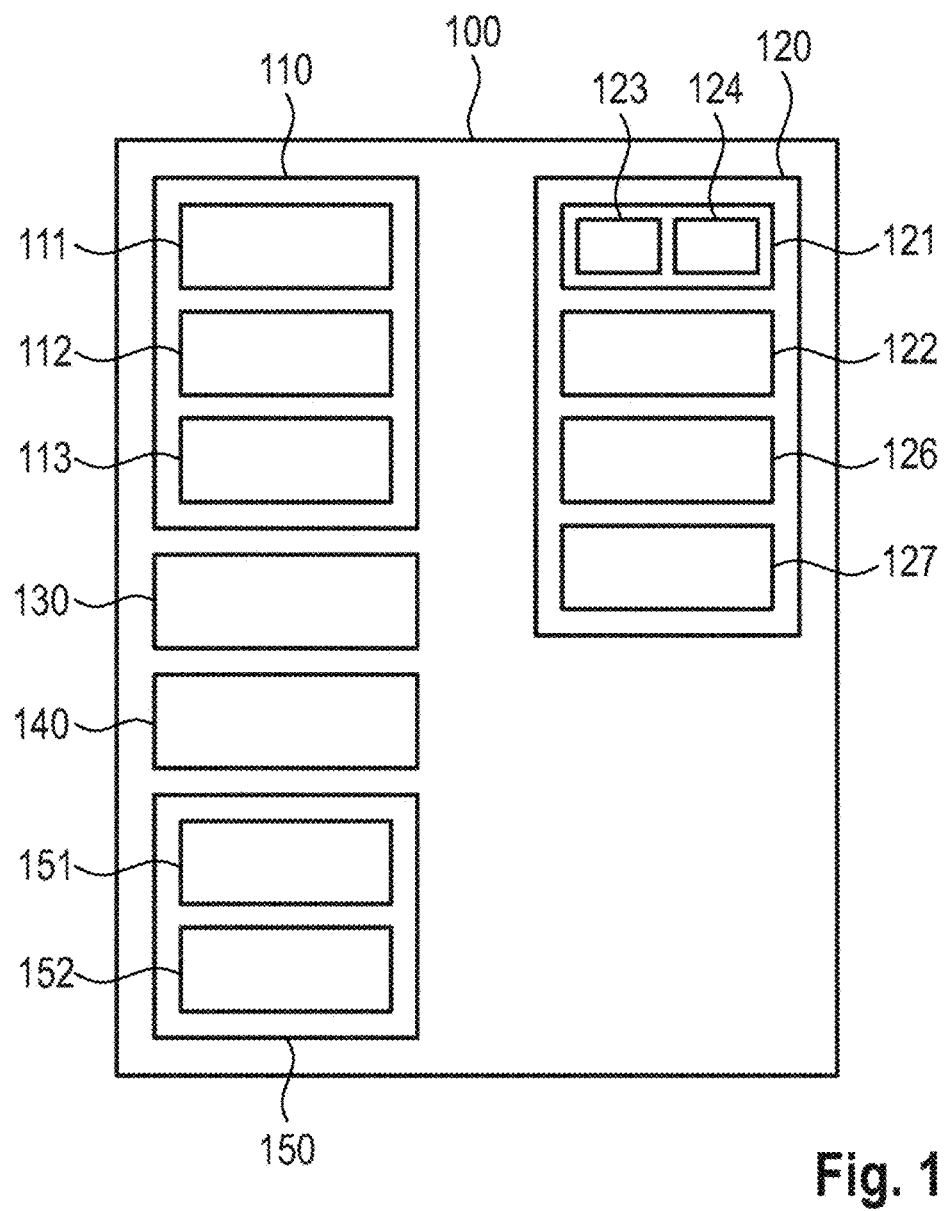
FIG. 1 a schematic block diagram of a device according to an embodiment of the present invention.

The accompanying figures are intended to provide a further understanding of embodiments of the invention. They illustrate embodiments and, in conjunction with the description, serve to explain principles and concepts of the invention. Other embodiments and many of the above advantages will become apparent from consideration of the drawings. The elements of the drawings are not necessarily shown to scale to each other.

In the figures of the drawing, identical, functionally-identical and identically-working elements, features and components are provided with the same reference numerals, unless otherwise stated. The numbering of method steps serves primarily to distinguish them and is not intended to necessarily imply a chronological order, unless explicitly stated otherwise.

DESCRIPTION OF EXEMPLARY EMBODIMENTS

FIG. 1 shows a schematic block diagram of a device 100 according to an embodiment of the present invention.

Figure 2:
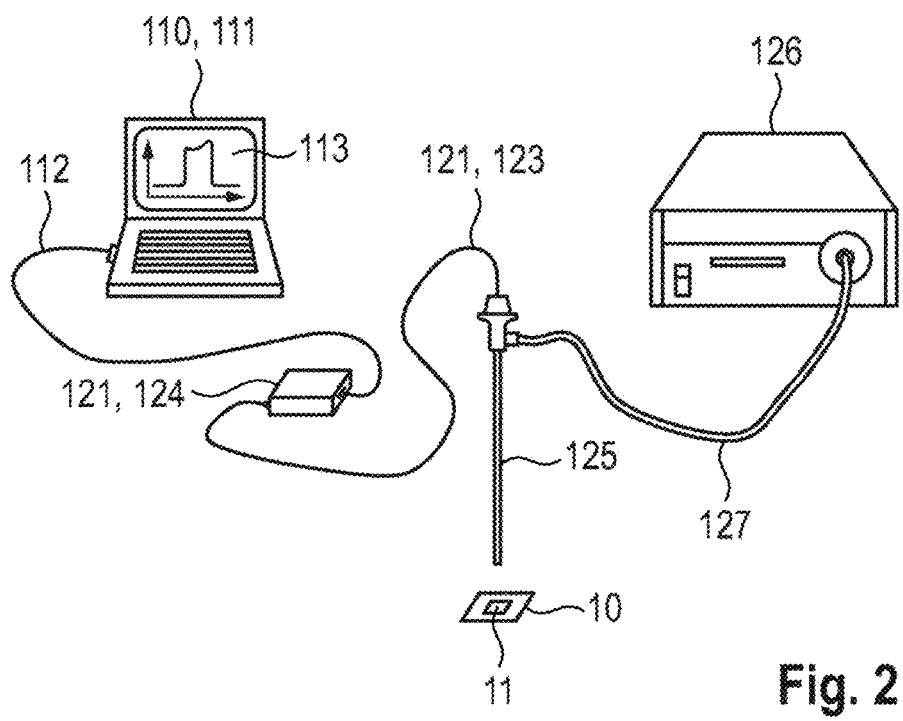
FIG. 2 a schematic representation of a part of the device of FIG. 1 according to a variant.

Accompanying this, FIG. 2 shows a schematic representation of a part of the device 100 according to FIG. 1 according to a variant.

The device 100 is in particular a surgical device, i.e. it can be used during, or to assist in, a surgical procedure. The device 100 can also comprise a surgical instrument. Essentially, as already described in detail above, the device 100 serves to assign tissue sections in a multispectral image to at least one reference tissue type. For this purpose, a plurality of reference tissue types can be defined, and it can be provided that each part of a tissue region to be examined is assigned to some reference tissue type, and the like.

Devices and methods of the present invention will be described below using a concrete application example in which the aim is to distinguish between oxygenated and deoxygenated tissue. It is understood that the elements, method steps and techniques described herein can be adapted and applied to a variety of other examples, particularly in accordance with the variants, modifications and further developments described above.

For this application example, two different reference tissue types are to be defined via the input interface 110:
1) oxygenated tissue and
2) deoxygenated tissue.

The input interface 110 can be implemented, for example, via a personal computer 111 of the device 100, on which a control software with a graphical user interface, GUI 113, is executed. By means of the GUI 113, the user can, for example, put the device 100 into a definition mode in which the device 100 waits for the definition of at least one reference tissue section.

To do so, the user may select a button called "Add new reference tissue section" in the GUI 113 and is then prompted to present a tissue region to a first multispectral image sensor 121 of a multispectral image sensor arrangement 120 of the device 100.

As or instead of the personal computer 111, a general computer or a general computing device can be used, for example with a Windows or Linux operating system, or also a dedicated computer which is specifically intended for use in examination rooms or operating theaters. It can also be a terminal that is connected to an intranet of a hospital or research institute or even to a cloud computing platform.

As shown in FIG. 2, the first multispectral image sensor 121 may be attached to an endoscope 125, for example. By way of example, the first multispectral image sensor 121 in FIG. 2 comprises a light guide 123 attached to the endoscope 125 and a spectrometer 124. The spectrometer 124 is connected and operatively linked to the personal computer 111 via a connection cable 112 (e.g. a USB, universal serial bus, cable), such that the recorded electromagnetic spectra or multispectral intensity profiles can be detected, stored, displayed, evaluated, etc. in the control software of the personal computer 111, in particular by means of the GUI 113.

For example, to define the oxygenated tissue, the user can simply hold their own finger in front of the first multispectral image sensor 121 and confirm the image detection in the GUI 113. In a false-color image displayed on a screen 115 of the device 100, the user can then mark a tissue section of the represented finger—for example with a mouse cursor. This tissue section is thus defined as a reference tissue section 11 for a first reference tissue type (namely oxygenated tissue). The GUI 113 can prompt the user to name this reference tissue type or use a default name. The screen 115 can be identical to a screen of the personal computer 111 on which, for example, the GUI 113 is displayed, but it may also be different devices.

It is understood that for other tissue types, the user does not always need to use their own body as a reference source; for example, reference tissue sections 11 can also be arranged on a patient to be examined, arranged on a patient other than the patient currently being examined, or even come from tissue preparations. FIG. 2 schematically represents the case in which the reference tissue section 11 is defined using a tissue preparation 10.

The user can then again select "Add new reference tissue section" in the GUI 113 and repeat the steps, but this time first tying their own finger with a string or the like to obtain deoxygenated tissue.

After a tissue section of the finger has been defined in the false-color image of the deoxygenated finger using the screen 115 and a second reference tissue type has thus been defined (namely the one to which this tissue section belongs), and this has also been named if necessary, the user can end the definition mode using the GUI 113.

As already mentioned above, it is particularly advantageous if the at least one reference tissue section 10 is defined under substantially, preferably exactly the same, external conditions as intensity profiles of the tissue region to be examined are later detected. The external conditions include in particular the lighting situation, as this can clearly have a significant influence on the intensity profiles. Therefore, it is conceivable that characteristic distributions of multispectral intensity profiles for certain reference tissue types are pre-stored and only retrieved from a data memory 130 of the device 100, e.g. by means of the control software. However, a close temporal proximity of definition and assignment under substantially the same external conditions is advantageous.

The data memory 130 can be, for example, a hard disk or a non-volatile solid state memory. The data memory 130 can, for example, be a data memory of the personal computer 111, although other data memories are also conceivable (e.g. cloud-based data memory of a hospital or research institute). The data memory 130 can also be implemented by physically separate data memory units, which can store, for example, different data of the device 100.

Predefined characteristic distributions of multispectral intensity profiles, CDMIs, can be provided in the data memory 130 and selected by the user via the graphical user interface, GUI 113. For example, the GUI 113 can provide the user with a menu navigation of different tissue types, preferably comprising different states (e.g., oxygenated, deoxygenated) to be selected. By selecting one or a plurality of tissue types, the user can thus indirectly select a respective CDMI assigned to the tissue type (and, if applicable, its state).

The state can be an internal state of the tissue, e.g. a physical, physiological or pathological state of the tissue. However, external states (or external conditions) of the tissue are also conceivable, for example a lighting situation, an arrangement or orientation of the tissue or patient, a position of the tissue (e.g. above sea level) and the like.

A first menu level of the selection menu of the graphical user interface, GUI 113, can offer the user the choice between a plurality of tissue types, whereupon in a second menu level different states of this tissue type can be selected. More than two menu levels are also conceivable, for example if a body part or body region on which the tissue type is arranged (e.g. epidermis or interior of the body) can be selected on a first menu level, then a coarse tissue type can be selected on a second menu level, then a specific tissue subtype of the coarse tissue type can be selected on a third menu level, and lastly a state of the tissue subtype can be selected on a fourth menu level. The number of menu levels may vary depending on the user's specific selections, such as when there are no tissue subtypes or different states for some coarse tissue types.

Predefined CDMIs can be stored in a central data memory 130, for example in a data cloud. In this way, various participants, such as hospitals, research institutes and universities, can store their own CDMIs with associated description data (e.g. to enable the menu navigation described above) in the central data memory 130, and individual users can be given the opportunity to retrieve and use CDMIs not only stored locally, but also stored on the central data memory 130—usually in addition to the possibility of defining their own reference tissue sections and thus reference tissue types.

It can also be provided that based on a current setting (in particular due to a planned use) or a current configuration of the device 100, at least one CDMI is automatically selected, or the selection menu of the graphical user interface, GUI 113, is determined or adapted thereby. For example, if an endoscopic operation is planned, the selection in the selection menu can be limited to those CDMIs that were detected in this situation, e.g. with regard to the possible tissue types, the possible lighting, etc. By eliminating unsuitable and inappropriate CDMIs from the selection menu, the user can operate the device 100 more quickly and easily and the likelihood of errors is objectively reduced.

However, the predefined and stored characteristic distributions of multispectral intensity profiles, CDMIs, are then advantageously adapted to the external conditions currently present in the indication mode, i.e. when examining the tissue region to be examined. This may include, for example, a white balance depending on the lighting situation.

Defining reference tissue sections in situ, i.e. advantageously (near or) directly on the patient on whom an examination (either surgical or non-invasive) is performed, is preferred. This not only allows the external conditions to be kept as similar as possible between definition and indication mode, but also implicitly takes into account that the same tissue type in the same tissue state may look different in different patients. For example, patients may have different skin colors, different levels of skin tanning, different levels of tissue aging, and/or the like.

The definition or detection of new CDMIs using the device 100 can occur either before performing a scheduled examination, or even while performing the examination in real time. The advantage of detection prior to examination is that it can be carried out in peace and under particularly controlled conditions. The advantage of detection during examination is that the situation during definition is particularly similar to that during the examination. Since the invention is based on the evaluation of electromagnetic spectra, the respective current lighting situation is of particular importance. Accordingly, a white balance between CDMIs and images of a tissue region to be examined recorded during the examination may either be necessary or—advantageously—may not be necessary if the lighting situation is identical, in particular if the detection of CDMIs and the recording of the tissue region to be examined take place simultaneously or in real time.

Figure 3:
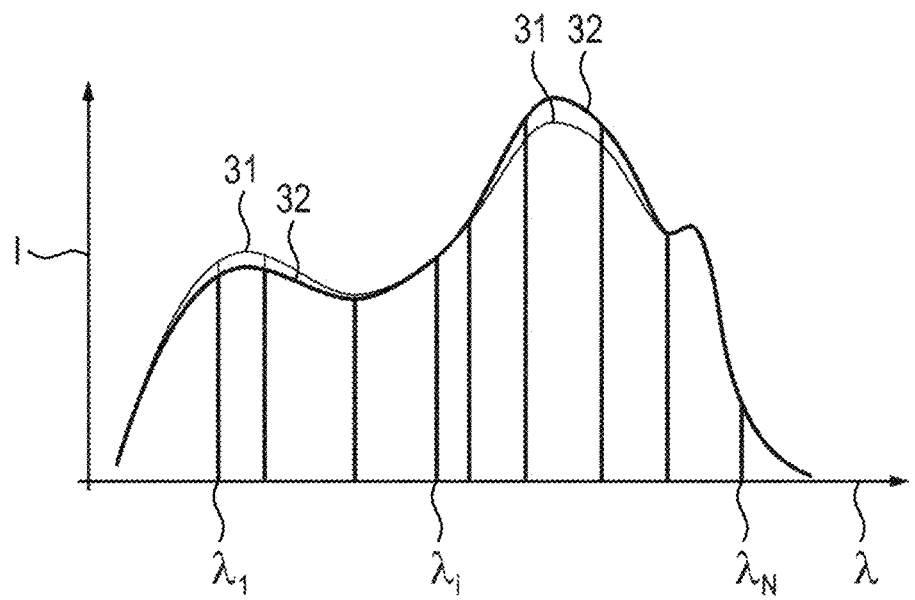
FIG. 3 exemplary multi- and hyperspectral intensity profiles.

FIG. 3 schematically shows a hyperspectral (i.e. a continuous multispectral) intensity profile 31 for oxygenated tissue on the one hand and a hyperspectral intensity profile 32 for deoxygenated tissue on the other hand, each in the visible light range. The vertical axis shows an intensity I, the horizontal axis wavelengths $\lambda$. It can be seen that at lower wavelengths, i.e. tending towards the reddish range, the deoxygenated tissue shows lower intensities than the oxygenated tissue (local maximum on the left). Conversely, the oxygenated tissue shows lower intensities at higher wavelengths, i.e. in the bluish range (local maximum in the middle), than the deoxygenated tissue. This is consistent with the fact that deoxygenated tissue appears more bluish and less reddish to the human eye than oxygenated tissue.

FIG. 3 also illustrates some discrete standard wavelengths $\lambda_1 \ldots \lambda_N$ for which discrete intensity values were detected to generate the intensity profile, for example within N channels of a multispectral image. The horizontal axis shows the respective intensity I. As described below, the further processing of discrete multispectral intensity profiles is simpler than the processing of continuous hyperspectral intensity profiles and will therefore be described first. For the sake of clarity, only ten standard wavelengths $\lambda_1 \ldots \lambda_N$ with N=10 are shown in FIG. 3. However, it is understood that the number of standard wavelengths will typically be significantly higher, for example between 30 and 200, between 50 and 150, between 75 and 125 or substantially 100 standard wavelengths.

After the two reference tissue sections and thus also the associated reference tissue types have been defined, the device 100 can be put into the indication mode, either manually (e.g. with the help of the GUI 113), automatically, or even just implicitly.

In the indication mode, the device 100 is configured to use the multispectral image sensor arrangement 120 to detect a multispectral intensity profile of each position of a second plurality of positions of a tissue region to be examined. This can be done with the same (first) multispectral image sensor 121 which was also used for detecting the reference tissue sections 11, or with another (second) multispectral image sensor 122 of the multispectral image sensor arrangement 120, as already described above.

The multispectral image sensor arrangement 120 can also have a light source 126 with a defined emission spectrum for light or electromagnetic waves and a light guide 127 by means of which the light emitted by the light source 126 is guided to illuminate the reference tissue section.

During an endoscopic examination, the second multispectral image sensor 122 is advantageously arranged on an endoscope 125, e.g. flanged or integrated therein. During an endoscopic examination, the second multispectral image sensor 122 is advantageously arranged on an exoscope, e.g. flanged or integrated therein. The multispectral image sensor 122 can be detachably attached, e.g. screwed, clipped, or the like, to the endoscope 125 or exoscope.

In the present exemplary embodiment of the device 100, in which the device 100 is configured and used for recognizing oxygenated tissue and deoxygenated tissue, a real-time image of the second multispectral image sensor 122 (or correspondingly of the first multispectral image sensor 121) is advantageously displayed to the user by means of a display device 140. The display device 140 can again be the same one that represented the graphical user interface, GUI 113, and/or the same as the screen 115 or another one. A touch-sensitive monitor, i.e. a touchscreen, is particularly suitable. Furthermore, the likewise preferred case is described in which the assignment to the defined reference tissue types is also carried out in real time and is also indicated in real time by the display device 140.

Furthermore, in the present embodiment, the tissue region to be examined is everything that is currently detected (or recorded) by the second multispectral image sensor 122. The hyperspectral image of the second multispectral image sensor 122 can be displayed to the user in true colors and/or in false colors. It can be supplemented by a true-color image, which can either also be generated from the output of the multispectral image sensor 122 or which can be generated directly by an additional, conventional camera (RGB image sensor) of the endoscope 125 or exoscope. Thus, the true-color image allows the user to examine in the usual way, while the additional false-color image provides the user with information about the different tissue types.

A computing device 150 of the device 100 is provided for the evaluation. The computing device 150 can also be integrated into other elements of the device 100, e.g. into the personal computer 111. In the described embodiment, multispectral intensity profiles of each pixel of the recording of the second multispectral image sensor 122 are detected and evaluated. If the evaluation is to be reduced in effort as described above, it can be provided that the computing device 150 makes a pre-selection (e.g. according to a regular grid) of pixels. For the present description, however, it is assumed that a multispectral intensity profile is detected for each pixel, i.e. measured by the multispectral image sensor 122 and then also stored by the device 100 (e.g. in the data memory 130). With N channels (each corresponding to a standard wavelength) and a spatial resolution of x times y pixels, for each image, x times y times N values are detected.

The computing device 150 is configured to determine whether based on the CDMIs detected, at least one tissue section of the tissue region to be examined can be assigned to one of the reference tissue types. In the present embodiment, the computing device 150 is configured to assign each pixel of the tissue region to be examined either to the first reference tissue type (oxygenated tissue) or to the second reference tissue type (deoxygenated tissue) or, if neither is possible, to a background. As described above, similarity metrics can be used to check whether an assignment is possible. A similarity metric may be a predefined formula that outputs a similarity value, in particular based on the CDMIs and the detected intensity profiles. A similarity value is an example of a reliability value, by means of which the reliability or robustness of an assignment (i.e. classification) can be quantified. The check of the assignability and—if possible—the assignment itself is carried out on the basis of the detected multispectral intensity profiles of the pixels of the tissue region to be examined.

In other words, the assignment is initially done pixel by pixel, i.e. each pixel is assigned either to the first reference tissue type, the second reference tissue type or the background. Each assigned pixel, or each connected area of similarly assigned pixels, thus represents an assigned tissue section. The assignment of the pixels is lastly represented by the display device 140 by indicating each pixel according to its assignment, e.g. by representing it in a color.

Figure 4A:
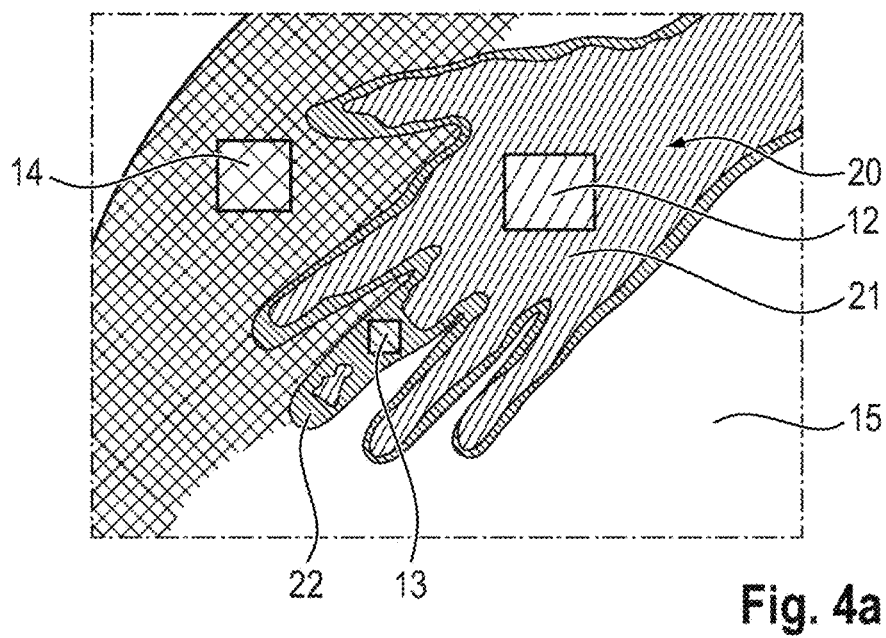
FIG. 4a schematically a result of an assignment by the device of FIG. 1 in a first application example.

FIG. 4a clearly shows an example in which a human hand can be seen in an image with the middle finger tied with a string. The hand corresponds here to the total tissue region 20 to be examined, with each recorded pixel being intended to be assigned in the example shown. In this example, a first reference tissue section 12 was defined in the oxygenated tissue region, a second reference tissue section 13 was defined in the deoxygenated tissue region, i.e. on the tied middle finger, and a third reference tissue section 14 was defined on another tissue region. In addition, there is a background 15 as a catch-all categorization. In FIG. 4a it can also be seen how, according to the present invention, substantially the entire hand (as a first assignable tissue section 21) is correctly indicated in the same way as the first reference tissue section 12 because its tissue is oxygenated. Likewise, substantially the entire middle finger (as a second assignable tissue section 22) is indicated in the same way as the second reference tissue section 13.

FIG. 4a thus also illustrates the advantages of the variant in which both the definition of reference tissue sections 12, 13, 14 and the display of the assignments are carried out with the same display device 140, for example in that the display device 140 has a touchscreen and/or is operatively connected in another way to the input interface 110 or is (completely or partially) identical. The input interface 110 can be integrated with the display device 140, which is thus set up both for defining the at least one reference tissue section 12, 13, 14 and for indicating the at least one tissue section assigned to the reference tissue type (here: all pixels each for their associated reference tissue type) of the tissue region 20 to be examined.

It is also advantageous if the display device 140 not only indicates the assignment(s), but also shows the defined reference tissue sections, as can be seen in FIG. 4a. The user thus receives an immediate opportunity to validate the assignments and thus also objective feedback from the device 100 as to whether or not the reference tissue sections (possibly) selected by them were appropriate.

In the example shown in FIG. 4a, multispectral intensity profiles in the range from 500 nanometers to 1000 nanometers were detected with 100 equidistant bands. Since the same image recording was used both for defining the reference tissue sections 12, 13, 14 and for detecting the intensity profiles of the tissue region 20 to be examined, the intensity profiles of the characteristic distributions of multispectral intensity profiles, CDMIs, of the reference tissue sections 12, 13, 14 and the intensity profiles of the tissue region to be examined advantageously have the same spectral resolution. Furthermore, the wavelength-dependent sensitivity of the multispectral image sensor arrangement 120 is thus the same in both cases, as are the external conditions such as illumination, orientation of the tissue sections and the like.

Figure 4B:
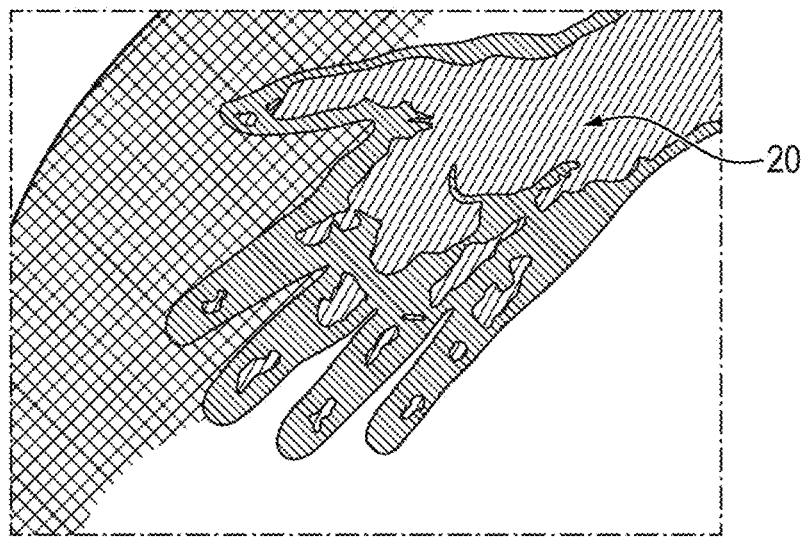
FIG. 4b schematically a result of an assignment by a method from the prior art in the first application example.

In comparison, FIG. 4b shows the representation of an assignment by a spectral angle mapper, SAM, from the known prior art, as will be explained in more detail below. It can be seen that—in contrast to the result represented in FIG. 4a—in FIG. 4b almost all fingers of the hand were falsely identified as deoxygenated.

Figure 5A:
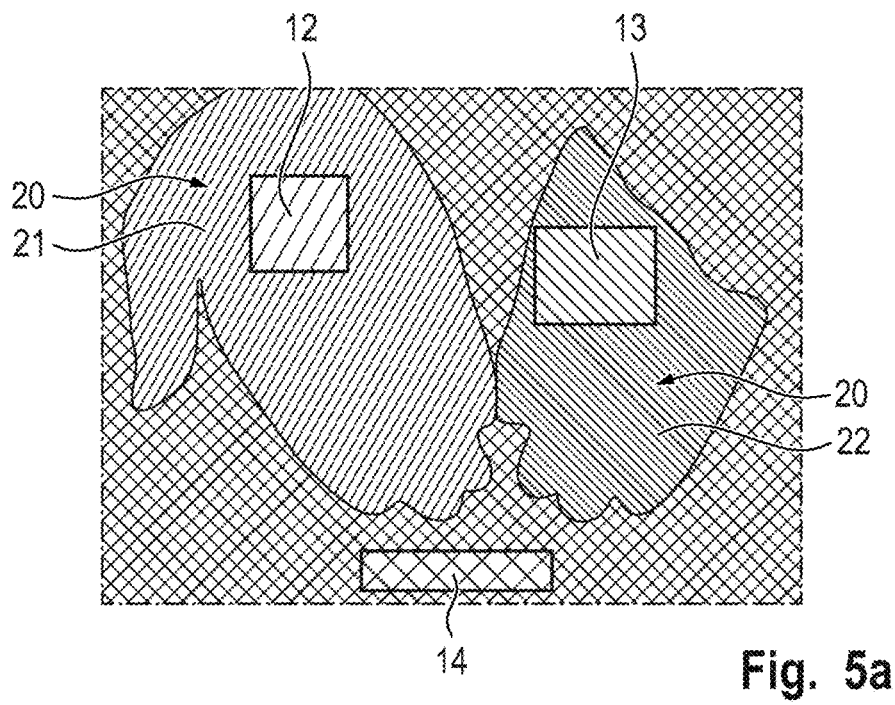
FIG. 5a schematically a result of an assignment by the device of FIG. 1 in a second application example.
Figure 5B:
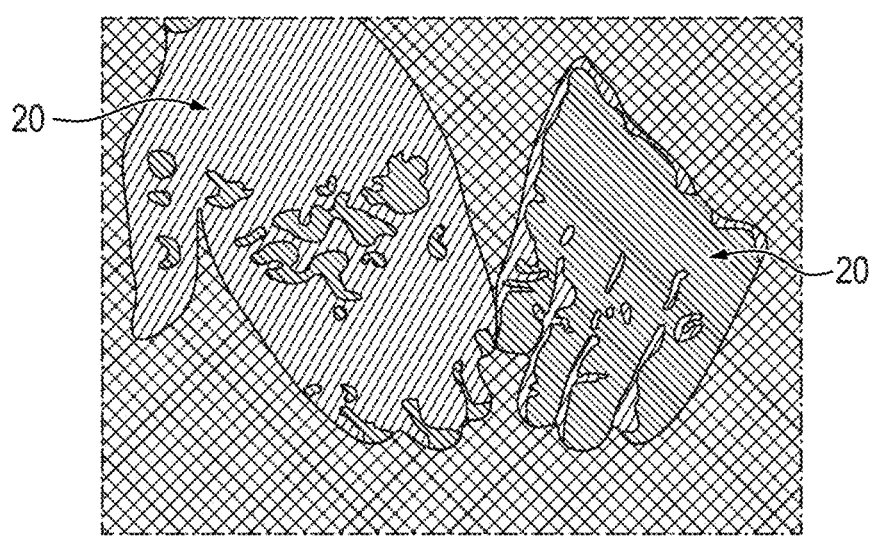
FIG. 5b schematically a result of an assignment by a method from the prior art in the second application example.

FIG. 5a shows a similar representation to FIG. 4a as a result of an assignment by a device 100 of the present invention, with the difference that the tissue region 20 to be examined comprises two hands, of which the entire left hand has been deoxygenated by tying. FIG. 5b again shows the result of the same situation for a spectral angle mapper (SAM) from the prior art. The comparison of FIG. 5a and FIG. 5b again shows how in FIG. 5a the recognition is significantly more accurate and noise-free, in that the right hand (as a first tissue section 21) was assigned to the reference tissue section 12 and thus to the reference tissue type "oxygenated tissue", and the left hand (as a second tissue section 22) was assigned to the reference tissue section 13 and thus to the reference tissue type "deoxygenated tissue".

As already mentioned, the assignment of individual pixels or larger tissue sections is advantageously carried out either by using a specialized evaluation algorithm, which has been improved compared to the prior art ("spectral angle mapping"), or by using artificial intelligence techniques.

The two techniques can each be used with all variants, options and further developments of both the device 100 according to the invention and the method according to the invention described above and below. First, the variant using an evaluation algorithm will be described.

In this variant, the computing device 150 is configured to implement a similarity determination module 151. The similarity determination module 151 is configured:

to generate a respective first parameter representation in a parameter space for the detected CDMIs according to a predetermined algorithm, to generate a respective second parameter representation in the same parameter space for at least one intensity profile of the second plurality of positions, and to calculate a similarity value between at least a first and at least a second parameter representation based on a predefined similarity metric, with the assignment of a tissue section to a reference tissue type being based on the determined similarities.

In minimally invasive surgery, assessment and classification based on physiological parameters such as perfusion parameters, metabolic activity or tissue oxygenation is of particular interest. Accordingly, reference tissue sections can be defined which exhibit these physiological parameters. The technique presented here significantly generalizes the spectral angle mapper method such that the scatter (or: distribution) of pixel intensities per specified tissue type is taken into account. This is reflected, among other things, in the use of characteristic distribution of multispectral intensity profiles, CDMI, instead of individual reference spectra. In other words, a reference tissue type is not characterized by a single reference spectrum, but by the associated characteristic distribution of multispectral intensity profiles, CDMI.

Figure 6A:
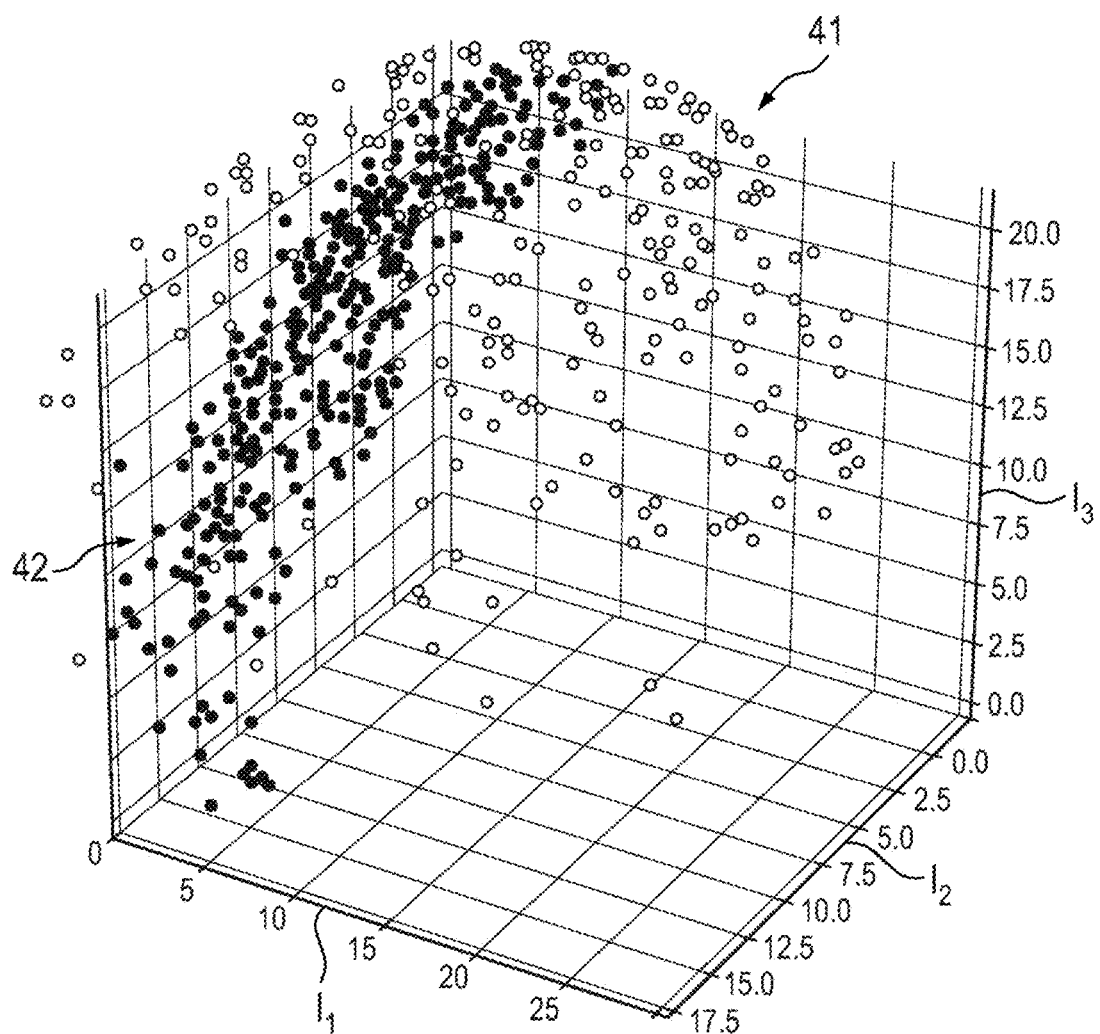
FIG. 6a schematically two different distributions of normalized multispectral intensity profiles for the case N=3.

In particular, the similarity determination module 151 performs the following steps:

1) To ensure that the classification results do not depend on the brightness at the time of detection, the intensity profiles of the reference tissue sections are normalized per pixel such that $|I|=[I_1^2+I_2^2+I_3^2+ \ldots +I_N^2]^{1/2}=1$, with the magnitude norm $|.|$, where N is the number of channels of the multi-/hyperspectral image (or, in other words, the number of reference wavelengths $\lambda_N$ or the spectral ranges), and $I_r$ the intensity of the radiation with the wavelength r (or the intensity of radiation in a spectral range defined by the wavelength r or in a spectral range with the numbering r). The measured multispectral intensity profiles per pixel thus lie on an N-dimensional spherical surface (see FIG. 6a for N=3) and exhibit different characteristic distributions, CDMI 41, 42, on this spherical surface depending on the tissue type.

2) A classical spectral angle mapper would directly calculate the angle between a single reference spectrum and the respectively measured intensity profiles with all the disadvantages described above. In contrast, in this invention, the detected multispectral intensity profiles are characterized by N−1 angles $\alpha_1, \ldots, \alpha_i, \ldots \alpha_{N-1}$, i.e. the position of the intensity profiles on the spherical surface is expressed by the angles to the first N−1 coordinate axes (see schematic FIG. 6b in two dimensions). The advantage of this approach is that the non-Euclidean geometry of the spherical surface is transformed into a Euclidean space of angles $\alpha_i$ such that distances can be measured more easily.

3) To characterize the variance of the characteristic distributions, CDMIs, the point clouds of the CDMIs 41, 42 in the angular space are subjected to a principal component analysis. Contrary to the normal application of principal component analysis, the primary goal is not to reduce the dimensionality, but to find the main axes along which the characteristic distribution of multispectral intensity profiles, CDMI, is aligned. The result of the principal component analysis is an N−1-dimensional vector p characterizing the mean values of each characteristic distribution, CDMI, as well as an (N−1)×(N−1)-dimensional matrix subsuming a total of N−1 main axis vectors.

4) For further classification, the width of the characteristic distribution, CDMI 41, 42, is determined along each main axis. This can be done by calculating the standard deviation, assuming a Gaussian distribution of the point cloud. In general, however, more complex probability distributions can also be fitted to the data points. However, Gaussian distributed points in the angular space (or in general: in a parameter space) are assumed below. In this case, the result of the variance calculation is an N−1 dimensional vector v, which indicates the standard deviation of the point cloud in each main axis direction. Steps 2)-4) are performed for all different characteristic distributions of multispectral intensity profiles, CDMIs, i.e. for all reference tissue sections/reference tissue types.

Figure 6B:
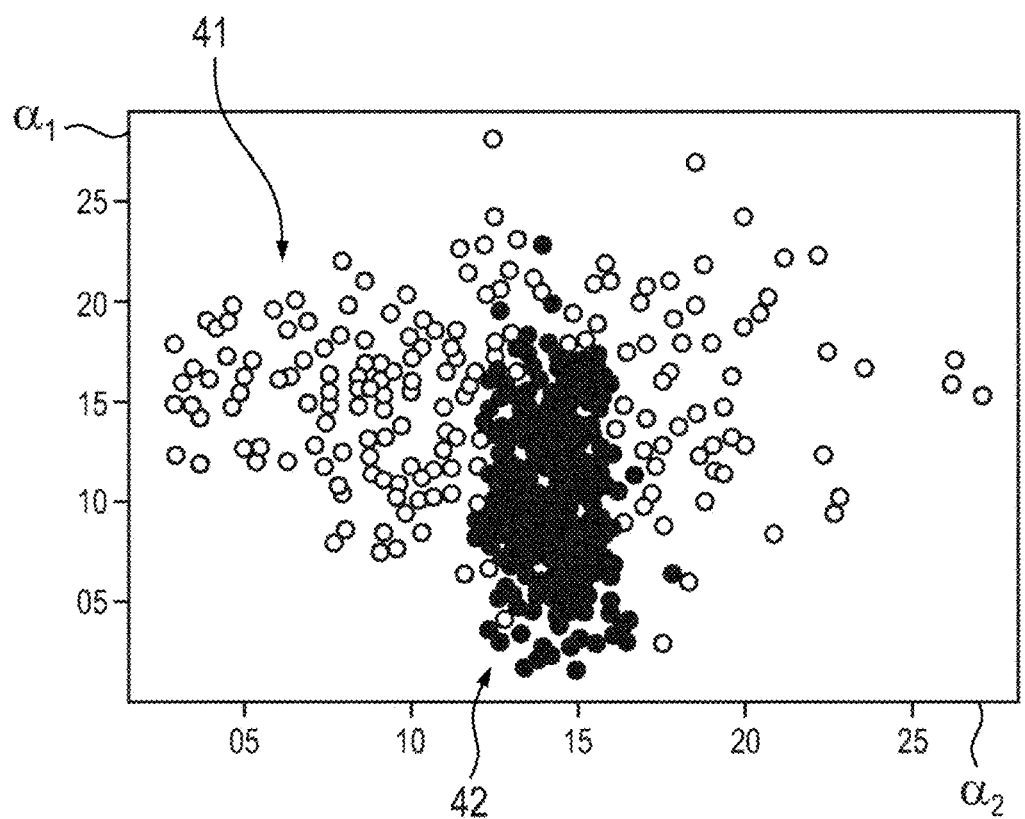
FIG. 6b a linearized representation of the distributions from FIG. 6a as a function of N−1 angles to the coordinate axes.
Figure 7A:
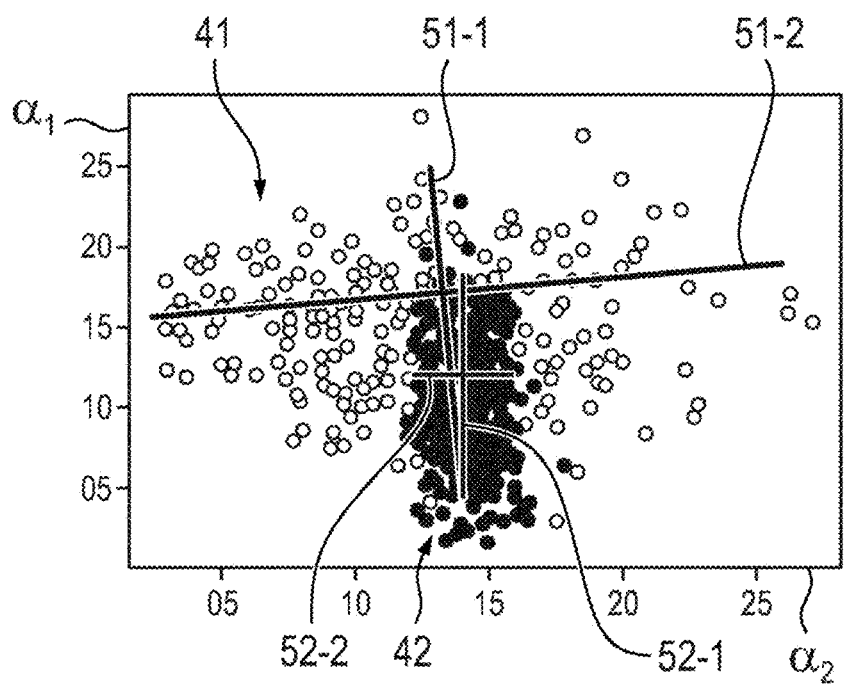
FIG. 7a representation as in FIG. 6b, but with marked main axes with the length of one standard deviation each.

FIG. 7a) shows, again for the example N=3 and thus only two (i.e. N−1=2) angles $\alpha_1$, $\alpha_2$, the two characteristic distributions of multispectral intensity profiles, CDMIs from FIG. 6b) again for the coordinate axes, each with marked main axes 51-1, 51-2, 52-1, 52-2, here each with the length according to a respective standard deviation according to a Gaussian distribution fit.

In order to compare a measured image with at least one characteristic distribution of multispectral intensity profiles, CDMI, the following steps are performed for each pixel:

5) The distance between the middle point of the characteristic distribution and the intensity profile of each detected pixel is projected by the scalar product with the main axes 51-1, 51-2, 52-1, 52-2 of the distribution in the respective main axis directions. The N−1 projected values are then divided by the associated standard deviations. This results in an (N−1)-dimensional vector d in which each entry indicates how far the measured pixel is from the middle point of the reference measurement in units of the respective standard deviation. In order to regulate outliers in individual dimensions, it is advisable to restrict entries in the vector that are further than 3 or 5 sigma from the middle point of the distribution. A threshold value is thus provided if individual dimensions have strong outliers.

Figure 7B:
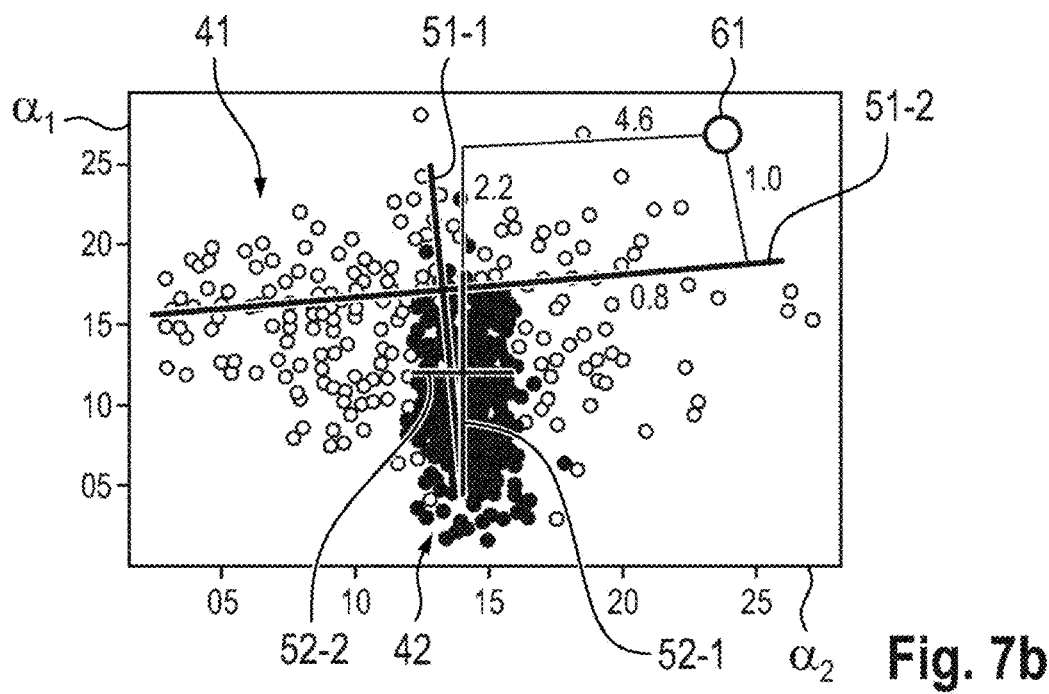
FIG. 7b representation as in FIG. 7a, but with measurement example of the distances to a multispectral intensity profile of a pixel.

FIG. 7b) shows the same as FIG. 7a), but additionally with an exemplary multispectral intensity profile 61 of a single pixel, together with the respective vertical distances of the intensity profile 61, each in units of the respective standard deviation of the respective main axis, to the main axes 51-1, 51-2, 52-1, 52-2 of the CDMIs 41, 42: The multispectral intensity profile 61 has a distance of approximately 0.8 standard deviations from a first main axis 51-1 of a first CDMI 41 and a distance of 1.0 standard deviations from a second main axis 51-2 of the first CDMI 41. The multispectral intensity profile 61 also has a distance of 4.6 standard deviations from a first main axis 52-1 of a second CDMI 42 and a distance of 2.2 standard deviations from a second main axis 52-2 of the second CDMI 42.

6) To generate from the vector d with the entries $d_i$ a scalar similarity value between the CDMIs on the one hand and the multispectral intensity profiles of the pixels j of the tissue region 20 to be examined, for each CDMI k (or, in other words, for each reference tissue type k) the calculated distances $d_i$ are offset according to the Gaussian distribution to a similarity value $X_k(j)$:

$$X_x(j) = \exp\left(-[d_1^2 - d_2^2 - d_3^2 - \ldots - d_{N-1}^2]/Y/N\right),$$

where $\gamma$ is a freely selectable parameter to improve the optical impression of the image. However, the parameter $\gamma$ is chosen to be the same for all CDMIs. The method is applied to all pixels of the tissue region 20 to be examined (or of the entire image containing the tissue region to be examined, as in FIG. 4a and FIG. 5a) and the similarity value X is plotted. The smaller the squared sum of the distances $d_i$ overall, the greater the similarity value $X_k(j)$. The similarity value $X_k(j)$ corresponds to the probability density of the assumed Gaussian distribution at the location of the measured pixel j.

7) For the assignment of each pixel j of the total number of pixels to the reference tissue types 11-14, the similarity value $X_1(j), \ldots, X_k(j), Xm(j)_M(j)$ is calculated for the different CDMIs, where M is the number of defined reference tissue types 11-14. The representation is then done in false colors: for each reference tissue type (i.e. each class) a color is defined (e.g. for three classes as in FIG. 4a to FIG. 5b red, green, blue).

Each pixel j is displayed by the display device 140 in the color assigned to the reference tissue type kmax(j) for which the corresponding similarity value $X_{kmax(j)}(j)$ is maximal among all reference tissue types k. A brightness of the color representation by the display device 140 can indicate the reliability of the classification in a coded manner: either the maximum value $X_{kmax(j)}(j)$ can be represented directly or the difference between the largest and second largest value $X_{kmax(j)} - X_{kmaxnext(j)}$, where kmaxnext(j) denotes the reference tissue type for which the similarity value $X_{kmaxnext(j)}(j)$ for the pixel j is second highest according to kmax(j). Other possible variants of the representation have already been explained above.

In the further variant in which (instead of the similarity determination module 151 or in addition thereto) artificial intelligence techniques are used to carry out the assignment, the computing device 150 is advantageously configured to implement an artificial intelligence module, AIM 152. The artificial intelligence module, AIM 152, is trained and configured to receive the CDMIs 41, 42 and at least one multispectral intensity profile of the second plurality of positions as input and, based thereon, to generate an output which indicates a similarity of at least one tissue section 21, 22 (corresponding to the second plurality of positions from which intensity profiles were obtained) to the at least one reference tissue section 11-14.

The artificial intelligence module, AIM 152, can thereby comprise (or be implemented as) a trained artificial neural network which is designed and/or trained as described above.

Figure 8:
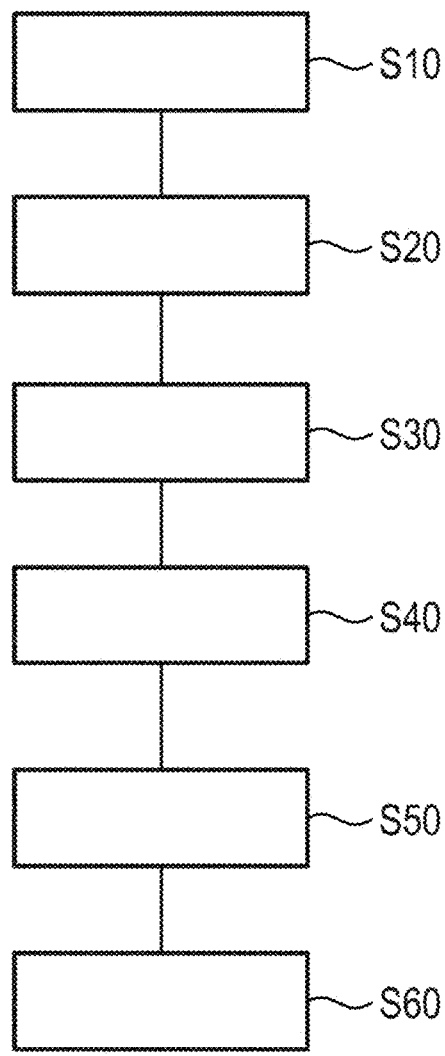
FIG. 8 a schematic flow chart for explaining a method according to an embodiment of the present invention.

FIG. 8 shows a schematic flow diagram of a method for examining an organic tissue according to an embodiment of the second aspect of the present invention. As already mentioned, the method can be carried out in particular with a device according to an embodiment of the first aspect of the present invention, in particular by means of the device 100 as described above with reference to FIGS. 1 to 8. Therefore, reference numerals from FIGS. 1 to 8 will also be used to describe the method according to the invention. However, it is understood that the method can also be carried out independently of the device 100.

The method can be performed during a surgical procedure, such that reference tissue sections 11-14 and/or tissue regions to be examined are arranged within the human body and are detected, for example, by endoscopic means. However, the method can also be performed during non-invasive examinations, e.g. during a skin examination or the like. It can be used on living patients as well as on dead tissue.

The method comprises at least the following method steps:

In a step S10, at least one reference tissue section 11-14 of a human body is defined in order to define the assigned reference tissue type. This can be done, for example, as described above with reference to the input interface 110 and/or the display device 140. In particular, a reference tissue section 11-14 can be marked and thus defined in an image representation of a recording of a multispectral image sensor 121, 122. Image representation and recording preferably take place in real time.

In a step S20, for each defined reference tissue section 11-14, at least one respective characteristic distribution of multispectral intensity profiles, CDMI, is detected, with the respective CDMI 41, 42 comprising multispectral intensity profiles for each position of a first plurality of positions within the selected reference tissue section 11-14. Again, it is advantageous if each recorded pixel, which is part of the selected reference tissue section 11-14, is a position of the first plurality of positions. In other words, it is advantageous if each pixel belonging to the respective reference tissue section 11-14 is taken into account when generating the characteristic distribution of multispectral intensity profiles, CDMI 41, 42, for the respective reference tissue section 11-14.

In a step S30, a multispectral intensity profile 61 of each position of a second plurality of positions of a tissue region 20 to be examined is detected, for example a multispectral identity profile 61 of each pixel of the tissue region 20 to be examined of a multispectral (or hyperspectral image recording) or even of each pixel of the entire image recording. The tissue region 20 to be examined can be selected in a representation of the image recording (e.g. by the display device 140 and/or the graphical user interface, GUI 113) in the same way as the reference tissue section(s) 11-14.

In a step S40, it is determined whether, based on the detected characteristic distributions, CDMI 41, 42, at least one tissue section of the tissue region 20 to be examined can be assigned to a reference tissue type based on the detected multispectral intensity profiles 61 of positions of the second plurality of positions (via the reference tissue sections 11-14) associated with the at least one tissue section.

In a step S50, if at least one tissue section 21, 22 can be assigned to a reference tissue type, the corresponding at least one tissue section 21, 22 is assigned to the corresponding reference tissue type.

As already described above, the check in step S40 can also be performed incidentally by performing the assignment. The check can also be fulfilled trivially, namely if a reference tissue type "background" or the like is defined as a catch-all class, such that it is ensured that each pixel can be assigned to some reference tissue type. In other words, in some embodiments, step S40 can also be omitted, and in step S50, a corresponding reference tissue type can then simply be assigned to each tissue section, in particular to each pixel.

In a step S60, the at least one assigned tissue section is indicated as being assigned to the corresponding reference tissue type, for example, visually highlighted or marked (by color, by pattern) or the like by a display device 140 and/or a graphical user interface 113.

A particularly preferred embodiment of both the medical device 100 according to the invention and the medical method can thus be designed as follows: A surgeon performs a procedure to remove tumor tissue from the body of a patient. First, the body of the patient is opened. Either endoscopically or exoscopically, a real-time camera image of the tumor and the surrounding tissue is then recorded by a multispectral camera device and represented, preferably in true color, on a touchscreen set up in the operating room.

In this real-time image, the surgeon now defines S10 the tumor tissue known to them as a reference tissue section by marking it on the touchscreen. This simultaneously assigns the marked tissue section to the reference tissue type "tumor tissue" or, in other words, defines the reference tissue type.

Of course, the definition S10 of the reference tissue section can alternatively be carried out as described above according to one of the many other variants. Input interface 110, graphical user interface 113, and screen 115 (and optionally other elements of device 100) can thus all be implemented by the touchscreen. The device g100 can be put into a definition mode for defining S10, for example by pressing a virtual button on the touchscreen or by one of the other variants mentioned (voice command, foot switch, etc.).

The device 100 will automatically detect S20 the characteristic distribution of multispectral intensity profiles, CDMI, of the tumor tissue, for example for each pixel, based on the defined reference tissue section from the real-time camera image.

Next, the surgeon surgically removes the tumor tissue. Subsequently, under the same lighting situation (advantageously also from the same position and orientation), the device 100 is put into the analysis mode. In this case, a real-time camera image is again (or still) recorded by the multispectral camera device, and a multispectral intensity profile is detected S30 for each pixel in the detection range of the multispectral camera device. The tissue region to be examined is thus the entire real-time camera image, and the second plurality of positions is simply the totality of all pixels therein. The multispectral camera device thus functions both as a first multispectral image sensor 121 and as a second multispectral image sensor 122.

Next, the device will now determine S40 whether, according to the detected characteristic distribution of multispectral intensity profiles, CDMI, of the tumor tissue, at least one tissue section in the real-time camera image can be assigned to the reference tissue type "tumor tissue" (i.e. tumor tissue is still present), and, if this is the case, carry out the assignment accordingly (S50).

The touchscreen can then be used to indicate (e.g. by color overlay in the true-color image, borders, warning arrows, etc.) which tissue sections in the real-time camera image have been assigned to the tissue type "tumor tissue," and not just any general tumor tissue, but specifically the one that was removed and previously used to define the reference tissue section. The touchscreen therefore also functions as a display device 140.

In the present example, this method will show the surgeon whether all tumor tissue has been successfully removed or whether such tissue is still present.

A basic idea of the invention can be briefly described as follows: The invention provides a device 100 and a method for examining an organic tissue. According to the invention, a reference tissue section 11-14 is defined, which simultaneously also defines a reference tissue type. For this reference tissue section 11-14, a characteristic distribution of multispectral intensity profiles, CDMI 41, 42, is detected. For a tissue region 20 to be examined, multispectral intensity profiles 61 are again detected. The assignment of tissue sections 21, 22 of the tissue region 20 to be examined to the reference tissue types 11-14 is based on the intensity profiles 61 and the characteristic distributions, CDMI 41, 42, for example due to a similarity.

In the previous detailed description, various features have been summarized in one or more examples to improve the stringency of the presentation. It should be understood, however, that the above description is merely illustrative and not restrictive. It is intended to cover all alternatives, modifications and equivalents of the various features and exemplary embodiments. Many other examples will be immediately and directly clear to the person skilled in the art on the basis of their technical knowledge in view of the above description. The exemplary embodiments have been selected and described in order to best illustrate the principles underlying the invention and its possible applications in practice. This enables those skilled in the art to optimally modify and utilize the invention and its various exemplary embodiments in relation to the intended purpose.

LIST OF REFERENCE NUMERALS

10 Tissue preparation
11 Reference tissue section (general)
12 Reference tissue section (oxygenated tissue)
13 Reference tissue section (deoxygenated tissue)
14 Reference tissue section (additional tissue)
15 Background
20 Tissue region to be examined
21 Assigned tissue section
22 Assigned tissue section
31 Multispectral intensity profile
32 Multispectral intensity profile
41 First characteristic distribution of multispectral intensity profiles, CDMI
42 Second characteristic distribution of multispectral intensity profiles, CDMI
51-1 First main axis of the first CDMI 41
51-2 Second main axis of the first CDMI 41
52-1 First main axis of the second CDMI 42
52-2 Second main axis of the second CDMI 42
61 Multispectral intensity profile of a pixel
100 Device
110 Input interface
111 Personal computer
112 Connection cables
113 Graphical user interface
115 Screen
120 Multispectral image sensor arrangement
121 First multispectral image sensor
122 Second multispectral image sensor
123 Light guide
124 Spectrometer
125 Endoscope
126 Light source
127 Light guide
130 Data memory
140 Display device
150 Computing device
151 Similarity determination module
152 Artificial intelligence module
S10 . . . . S60 Method steps

The invention claimed is:

1. A medical device, in particular surgical device, for examining an organic tissue, comprising:
an input interface by means of which at least one reference tissue section of a human body can be defined in order to define an assigned reference tissue type;

a multispectral image sensor arrangement which is designed:
    to detect at least one respective characteristic distribution of multispectral intensity profiles, CDMI, for each defined reference tissue section, wherein the respective characteristic distribution, CDMI, comprises multispectral intensity profiles for each position of a first plurality of positions within the selected reference tissue section;
    as well as to detect a multispectral intensity profile of each position of a second plurality of positions of a tissue region to be examined,
a computing device which is configured to determine whether, based on the detected characteristic distributions, CDMI, at least one tissue section of the tissue region to be examined can be assigned to a reference tissue type using the detected multispectral intensity profiles of positions of the second plurality of positions associated with the at least one tissue section, and, if this is the case, to assign the at least one tissue section accordingly; and
a display device which is configured to indicate the at least one assigned tissue section as being assigned to the corresponding reference tissue type.

2. The medical device according to claim 1, wherein the input interface is integrated into a display device which is configured both to define the at least one reference tissue section and to indicate the at least one tissue section of the tissue region to be examined which is assigned to the reference tissue type.

3. The medical device according to claim 1, wherein at least one tissue section of interest, TSI, can be defined by means of the input interface, and the computing device is configured to determine at least for the TSI whether it can be assigned to a reference tissue type based on the positions of the second plurality of positions associated with this TSI, and, if this is the case, to assign the TSI to the corresponding reference tissue type.

4. The medical device according to claim 1, wherein the computing device is configured to implement an artificial intelligence module which is trained and configured to receive the at least one characteristic distribution, CDMI, and at least one multispectral intensity profile of the second plurality of positions as input and, based thereon, to generate an output which indicates a similarity of at least one tissue section to the at least one reference tissue section.

5. The medical device according to claim 1, wherein the computing device is configured to implement a similarity determination module which is configured to generate a respective first parameter representation in a parameter space for the detected characteristic distributions, CDMI, according to a predetermined algorithm, to generate a respective second parameter representation in the same parameter space for at least one intensity profile of the second plurality of positions, and to calculate a similarity value between at least a first and at least a second parameter representation based on a predefined similarity metric, wherein the assignment of a tissue section to a reference tissue type is based on the determined similarities.

6. The medical device according to claim 1, wherein the device is configured to display a real-time image of the tissue region to be examined by means of the display device and to graphically indicate the at least one assigned tissue section as being assigned to the corresponding reference tissue type in the real-time image substantially in real time.

7. The medical device according to claim 1, wherein a multispectral image sensor of the multispectral image sensor arrangement is arranged or integrated on or in an endoscope or exoscope.

8. The medical device according to claim 1, wherein the positions of the first plurality of positions and/or the positions of the second plurality of positions are given by pixels according to a spatial resolution of a multispectral image sensor of the multispectral image sensor arrangement, in particular within the same image, preferably a real-time image.

9. The medical device according to claim 1, wherein the multispectral intensity profiles of the characteristic distributions, CDMI, of the reference tissue sections, have a higher spectral resolution than the multispectral intensity profiles of the positions of the second plurality of positions.

10. The medical device according to claim 1, wherein the computing device is configured to monitor the characteristic distributions of multispectral intensity profiles, CDMI of the positions of the first plurality of positions for possible changes and, if changes correspond to a predefined relevance criterion, to cause the affected characteristic distributions of multispectral intensity profiles to be re-detected.

11. A medical method for examining an organic tissue, comprising the method steps:
    defining at least one reference tissue section of a human body in order to define an assigned reference tissue type;
    detecting at least one respective characteristic distribution of multispectral intensity profiles, CDMI for each defined reference tissue section, wherein the respective characteristic distribution, CDMI, comprises multispectral intensity profiles for each position of a first plurality of positions within the respective defined reference tissue section;
    detecting a multispectral intensity profile of each position of a second plurality of positions of a tissue region to be examined;
    determining whether, based on the detected characteristic distributions, CDMI, at least one tissue section of the tissue region to be examined can be assigned to a reference tissue type using the detected multispectral intensity profiles of positions of the second plurality of positions associated with the at least one tissue section;
    assigning, if at least one tissue section can be assigned to a reference tissue type, the at least one tissue section accordingly; and
    graphically indicating the at least one assigned tissue section as being assigned to the corresponding reference tissue type.

* * * * *